US012198611B2

(12) United States Patent
Kim et al.

(10) Patent No.: US 12,198,611 B2
(45) Date of Patent: Jan. 14, 2025

(54) DISPLAY APPARATUS INCLUDING PIXEL ARRAYS FORMED OF SELF-EMISSIVE DEVICES

(71) Applicants: SAMSUNG ELECTRONICS CO., LTD., Suwon-si (KR); RESEARCH & BUSINESS FOUNDATION SUNGKYUNKWAN UNIVERSITY, Suwon-si (KR)

(72) Inventors: Jinho Kim, Suwon-si (KR); Yong-Sang Kim, Suwon-si (KR); Donggun Oh, Suwon-si (KR); Jongsu Oh, Suwon-si (KR); Eun Kyo Jung, Suwon-si (KR)

(73) Assignees: SAMSUNG ELECTRONICS CO., LTD., Suwon-si (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 22 days.

(21) Appl. No.: 18/129,504

(22) Filed: Mar. 31, 2023

(65) Prior Publication Data

US 2023/0237958 A1 Jul. 27, 2023

Related U.S. Application Data

(63) Continuation of application No. PCT/KR2021/010904, filed on Aug. 17, 2021.

(30) Foreign Application Priority Data

Oct. 5, 2020 (KR) ........................ 10-2020-0128365

(51) Int. Cl.
*G09G 3/32* (2016.01)
*G09G 3/20* (2006.01)

(52) U.S. Cl.
CPC ............. *G09G 3/32* (2013.01); *G09G 3/2074* (2013.01); *G09G 3/2011* (2013.01);
(Continued)

(58) Field of Classification Search
CPC ...... G09G 3/32; G09G 3/2011; G09G 3/2014; G09G 3/2074; G09G 3/2081;
(Continued)

(56) References Cited

U.S. PATENT DOCUMENTS 7,167,169 B2 1/2007 Libsch et al.
7,808,497 B2 10/2010 Lo et al.
(Continued)

FOREIGN PATENT DOCUMENTS

CN 104470147 A 3/2015
KR 10-2011-0071114 A 6/2011
(Continued)

OTHER PUBLICATIONS

Communication dated Sep. 22, 2023 issued by the European Patent Office in counterpart European Application No. 21877828.0.
(Continued)

*Primary Examiner* — Adam J Snyder
(74) *Attorney, Agent, or Firm* — Sughrue Mion, PLLC

(57) ABSTRACT

In a display apparatus, a display panel includes a pixel array of pixels, each pixel disposed on one of a plurality of row lines and including a plurality of inorganic LEDs, and a sub pixel circuit corresponding to each of the plurality of LEDs. Each sub pixel circuit includes a PMOSFET driving transistor, and drives a corresponding LED based on an applied image data voltage. A sensing part senses a current through the driving transistor of at least one sub pixel circuit based on a specified voltage applied to the sub pixel circuit, and outputs corresponding sensing data. A correcting part corrects an image data voltage applied to the sub pixel circuit
(Continued)

based on the sensing data. In each LED, an anode electrode is coupled to a common node to which a driving voltage is applied, and a cathode electrode is coupled to a source terminal of the driving transistor.

14 Claims, 19 Drawing Sheets

(52) U.S. Cl.
CPC ......... *G09G 3/2014* (2013.01); *G09G 3/2081* (2013.01); *G09G 2300/0842* (2013.01); *G09G 2310/0259* (2013.01); *G09G 2320/0233* (2013.01); *G09G 2320/0242* (2013.01); *G09G 2320/0285* (2013.01); *G09G 2320/029* (2013.01); *G09G 2320/043* (2013.01); *G09G 2360/16* (2013.01)

(58) Field of Classification Search
CPC ... G09G 2300/0842; G09G 2310/0259; G09G 2320/0233; G09G 2320/0242; G09G 2320/0285; G09G 2320/029; G09G 2320/043; G09G 2360/16
See application file for complete search history.

(56) References Cited

U.S. PATENT DOCUMENTS

| | | | | |
|---|---|---|---|---|
| 8,816,943 | B2 | 8/2014 | Kawabe | |
| 9,870,757 | B2 | 1/2018 | Genoe | |
| 10,706,766 | B2 | 7/2020 | Kim et al. | |
| 10,713,996 | B2 | 7/2020 | Kim et al. | |
| 10,825,380 | B2 | 11/2020 | Kim et al. | |
| 11,056,047 | B2 | 7/2021 | Shigeta et al. | |
| 2003/0103022 | A1* | 6/2003 | Noguchi | G09G 3/3233 345/77 |
| 2003/0112205 | A1* | 6/2003 | Yamada | G09G 3/3233 345/32 |
| 2005/0270204 | A1* | 12/2005 | Zhang | G09G 3/3275 341/144 |
| 2009/0187925 | A1 | 7/2009 | Hu et al. | |
| 2011/0057966 | A1 | 3/2011 | Ono | |
| 2011/0084993 | A1 | 4/2011 | Kawabe | |
| 2011/0279049 | A1 | 11/2011 | Kawabe | |
| 2015/0317951 | A1 | 11/2015 | Genoe | |
| 2016/0104411 | A1 | 4/2016 | Nathan et al. | |
| 2017/0263183 | A1 | 9/2017 | Lin et al. | |
| 2018/0182279 | A1 | 6/2018 | Sakariya et al. | |
| 2018/0182303 | A1* | 6/2018 | Jung | G09G 3/3258 |
| 2018/0293929 | A1* | 10/2018 | Shigeta | G09G 3/3233 |
| 2019/0371231 | A1 | 12/2019 | Kim et al. | |
| 2019/0371232 | A1 | 12/2019 | Kim et al. | |
| 2019/0378459 | A1* | 12/2019 | Kim | G09G 3/3291 |
| 2020/0111403 | A1 | 4/2020 | Kim et al. | |
| 2020/0111404 | A1 | 4/2020 | Kim et al. | |
| 2020/0265777 | A1 | 8/2020 | Shigeta et al. | |
| 2021/0304670 | A1 | 9/2021 | Shigeta et al. | |

FOREIGN PATENT DOCUMENTS

| | | | |
|---|---|---|---|
| KR | 10-1503823 | B1 | 3/2015 |
| KR | 10-2011178 | B1 | 8/2019 |
| KR | 10-1994107 | B1 | 9/2019 |
| KR | 10-2019-0136882 | A | 12/2019 |
| KR | 10-2020-0038735 | A | 4/2020 |
| KR | 10-2020-0038741 | A | 4/2020 |
| KR | 10-2020-0101605 | A | 8/2020 |
| WO | 2020151233 | A1 | 7/2020 |

OTHER PUBLICATIONS

International Search Report (PCT/ISA/210) issued by the International Searching Authority on Nov. 23, 2021 in corresponding International Application No. PCT/KR2021/010904.
Written Opinion (PCT/ISA/237) issued by the International Searching Authority on Nov. 23, 2021 in corresponding International Application No. PCT/KR2021/010904.
Communication issued Jul. 3, 2024 by the Korean Intellectual Property Office in Korean Patent Application No. 10-2020-0128365.

* cited by examiner

DISPLAY APPARATUS INCLUDING PIXEL ARRAYS FORMED OF SELF-EMISSIVE DEVICES

CROSS-REFERENCE TO RELATED APPLICATIONS

This application is a continuation application of International Application No. PCT/KR2021/010904, filed on Aug. 17, 2021, which is based on and claims benefit of priority to Korean Patent Application No. 10-2020-0128365, filed on Oct. 5, 2020, in the Korean Intellectual Property Office, the disclosures of each of which are incorporated by reference herein in their entireties.

BACKGROUND

1. Field

The disclosure relates to a display apparatus, and more particularly, to a display apparatus which includes a pixel array formed of self-emissive devices.

2. Description of Related Art

In a display apparatus that drives inorganic light emitting devices such as a red light emitting diode (LED), a green LED, and a blue LED (hereinafter, LED refers to an inorganic light emitting device) as sub pixels, a driving circuit (hereinafter, referred to as a sub pixel circuit) may be provided for each sub pixel to drive the respective sub pixels.

A threshold voltage (Vth) or mobility (μ) of a driving transistor included in each sub pixel circuit may be varied for each driving transistor. The driving transistor may be used in a determination of an operation of a sub pixel circuit. In theory, electrical properties such as threshold voltage (Vth) or mobility (μ) of a driving transistor are to be effectively identical to one another between sub pixel circuits of a display panel.

However, the threshold voltage (Vth) and mobility (μ) of an actual driving transistor may be varied for each pixel circuit due to various factors such as process variation and aging, and it may be necessary for the variation in electrical properties of the driving transistor to be compensated as it causes deterioration in image quality.

When a driving current flows in an inorganic light emitting device, a voltage drop by a level substantially equal to a forward voltage (Vf) may be generated at both ends of the inorganic light emitting device. Theoretically, a same forward voltage drop should be generated for the same driving current, but there may be a difference in the forward voltage (Vf) of an actual inorganic light emitting device. Because the variation in electrical properties of the inorganic light emitting device also cause deterioration in the image quality, there is a need for compensation.

Specifically, when implementing the driving transistor with a p-type metal-oxide-semiconductor field-effect transistor (PMOSFET), the sub pixel circuit may have a cathode common structure that uses an electrode to which a cathode terminal of the inorganic light emitting device is connected as a common electrode to set a stable driving voltage. However, in this case, there is a problem in that the forward voltage variation of the inorganic light emitting device may not be compensated.

SUMMARY

An object of the disclosed apparatus and method is to provide improved color reproducibility and improved brightness uniformity for image signals that are input.

Another object of the disclosed apparatus and method is to provide sub pixel circuits capable of driving inorganic light emitting devices more effectively and stably.

Another object of the disclosed apparatus and method is to provide driving circuits suitable for a large scale integration by optimizing designs of respective circuits that drive the inorganic light emitting devices.

According to an embodiment, a display apparatus includes a display panel which includes a pixel array of pixels, each pixel of the pixel array being disposed on one of a plurality of row lines, each pixel of the pixel array including a plurality of inorganic light emitting devices, and a sub pixel circuit corresponding to each of the plurality of inorganic light emitting devices. Each sub pixel circuit includes a driving transistor, and is configured to drive a corresponding inorganic light emitting device based on an image data voltage that is applied. The display apparatus also includes a sensing part configured to sense current that flows in the driving transistor of at least one sub pixel circuit based on a specific voltage that is applied to the at least one sub pixel circuit, and to output sensing data corresponding to the sensed current. The display apparatus also includes a correcting part configured to correct image data voltage that is applied to the sub pixel circuit based on the sensing data. The driving transistor is a p-type metal-oxide-semiconductor field-effect transistor (PMOSFET), and each inorganic light emitting device is configured such that an anode electrode thereof is coupled to a common electrode to which driving voltage is applied, and a cathode electrode thereof is coupled to a source terminal of the driving transistor.

The image data voltage may include a constant current generator data voltage, and the sub pixel circuit may include a first driving transistor and a constant current generator circuit. The constant current generator circuit may be configured to control a magnitude of driving current that is provided to the inorganic light emitting device based on the constant current generator data voltage that is applied to a gate terminal of the first driving transistor.

The specific voltage may include a first specific voltage that is applied to the gate terminal of the first driving transistor. The sensing part may be configured to sense first current that flows in the first driving transistor based on the first specific voltage, and to output first sensing data corresponding to the sensed first current The correcting part may be configured to correct the constant current generator data voltage based on the first sensing data.

The sub pixel circuit may include a first transistor by which a source terminal is coupled to a drain terminal of the first driving transistor, the drain terminal being coupled to the sensing part, and the first current may be provided to the sensing part through the first transistor while the first specific voltage is being applied to the gate terminal of the first driving transistor.

The constant current generator circuit may include a second transistor which is parallel coupled with the inorganic light emitting device, the constant current generator data voltage may be applied to the gate terminal of the first driving transistor while the second transistor is in a turned-on state, and driving current may be configured to flow in the inorganic light emitting device while the second transistor is in a turned-off state.

The constant current generator circuit may include a first capacitor which is coupled between a source terminal and the gate terminal of the first driving transistor, and a voltage at both ends of the first capacitor may be maintained regardless of a forward voltage drop in the inorganic light emitting device.

The image data voltage may further include a pulse width modulation (PWM) data voltage. The sub pixel circuit may include a second driving transistor and a PWM circuit configured to control a driving time of a driving current that is provided to the inorganic light emitting device based on the PWM data voltage that is applied to a gate terminal of the second driving transistor.

The specific voltage may include a first specific voltage that is applied to the gate terminal of the first driving transistor and a second specific voltage that is applied to the gate terminal of the second driving transistor. The sensing part may be configured to sense first current that flows in the first driving transistor based on the first specific voltage, output first sensing data corresponding to the sensed first current, sense second current that flows in the second driving transistor based on the second specific voltage, and output second sensing data corresponding to the sensed second current. The correcting part may be configured to correct the constant current generator data voltage based on the first sensing data, and correct the PWM data voltage based on the second sensing data.

The sub pixel circuit may include a first transistor by which a source terminal is coupled to a first drain terminal of the first driving transistor, the first drain terminal being coupled to the sensing part; and a third transistor by which a source terminal is coupled to a second drain terminal of the second driving transistor, the second drain terminal being coupled to the sensing part. The first current is provided to the sensing part through the first transistor while the first specific voltage is being applied to the gate terminal of the first driving transistor, and the second current is provided to the sensing part through the third transistor while the second specific voltage is being applied to the gate terminal of the second driving transistor.

The constant current generator circuit may include a second transistor which is parallel coupled with the inorganic light emitting device. The constant current generator data voltage may be applied to the gate terminal of the first driving transistor while the second transistor is in a turned-on state. The driving current may be configured to flow in the inorganic light emitting device while the second transistor is in a turned-off state.

The constant current generator circuit may include a first capacitor which is coupled between a source terminal and the gate terminal of the first driving transistor, and a voltage at both ends of the first capacitor may be maintained regardless of a forward voltage drop in the inorganic light emitting device.

The sub pixel circuit may be configured such that, based on a sweep voltage that changes linearly being applied while the constant current generator data voltage is applied to the gate terminal of the first driving transistor and the PWM data voltage is applied to the gate terminal of the second driving transistor, the driving current is provided to the inorganic light emitting device at a magnitude corresponding to the constant current generator data voltage until a voltage of a gate terminal of the second driving transistor is changed according to the sweep voltage and the second driving transistor is turned on.

The constant current generator circuit may include a fourth transistor configured to apply the constant current generator data voltage to a gate terminal of the first driving transistor while in a turned-on state. The PWM circuit may include a second capacitor which includes a first end to which a linearly changing sweep voltage is applied and a second end which is coupled with a gate terminal of the second driving transistor, and a fifth transistor configured to apply the PWM data voltage to the gate terminal of the second driving transistor while in a turned-on state. A drain terminal of the second driving transistor may be coupled to the gate terminal of the first driving transistor.

The image data voltage may be applied to the sub pixel circuit during a data setting interval from among one image frame period. The inorganic light emitting device may be configured to emit light based on the applied image data voltage in a light emitting interval from among the one image frame period. The sub pixel circuit may include a fifth transistor by which a source terminal is coupled to the drain terminal of the first driving transistor, the drain terminal being coupled to a ground voltage terminal, and the fifth transistor may be turned on during the light emitting interval.

The sensing part may be configured to sense current that flows in the driving transistor based on the specific voltage that is applied in a blanking interval of one image frame, and output sensing data corresponding to the sensed current.

The specific voltage may be applied to sub pixel circuits that correspond to a portion of row lines from among all of the row lines of the pixel array for each image frame.

The constant current generator circuit and the PWM circuit may be driven by different driving voltages.

The inorganic light emitting device may be a micro light emitting diode (LED) having a size of less than or equal to 100 micrometers.

According to various embodiments as described above, unevenness which can appear in images due to variations in electrical characteristics of a driving transistor and inorganic light emitting devices may be easily compensated. In addition, color correcting may become more easily facilitated.

In addition, when forming a modular display panel by combining display panels in module form, or even when forming one display apparatus with one display panel, it may be possible to compensate for unevenness and to correct color more easily.

In addition, a wavelength of light that is emitted by inorganic light emitting devices may be prevented from changing according to a grayscale.

In addition, it may be possible to design driving circuits that are more optimized, and drive the inorganic light emitting devices stably and efficiently.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

In the disclosure, when detailed description of related known technologies may unnecessarily confuse the gist of the disclosure, such detailed description will be omitted. In addition, redundant descriptions of a same configuration will be omitted as much as possible.

Suffixes such as “part” concerning elements that are used herein are applied or used interchangeably for convenience in describing the embodiments, and do not have distinct meaning or roles in themselves.

Terms have been used herein to describe the embodiments, and are not intended to limit the disclosure. A singular expression includes a plural expression, unless otherwise specified.

Terms such as “have” or “include” are used herein to designate a presence of a characteristic, number, step, operation, element, component, or a combination thereof, and not to preclude a presence or a possibility of adding one or more of other characteristics, numbers, steps, operations, elements, components or a combination thereof.

Expressions such as “first,” “second,” “1st,” “2nd,” and so on used herein may be used to refer to various elements regardless of order and/or importance, and it should be noted that the expressions are merely used to distinguish an element from another element and not to limit the relevant elements.

When a certain element (e.g., first element) is indicated as being “(operatively or communicatively) coupled with/to” or “connected to” another element (e.g., second element), it may be understood as the certain element being either directly coupled with/to the another element or coupled through an intermediate element or elements (e.g., third element).

On the other hand, when a certain element (e.g., first element) is indicated as “directly coupled with/to” or “directly connected to” another element (e.g., second element), it may be understood that intermediate elements (e.g., third element) are not present between the certain element and the another element.

The terms used herein may be interpreted to have meanings that are commonly known to those of ordinary skill in the art, unless otherwise specified.

Various embodiments of the disclosure will be described in detail below with reference to the accompanying drawings.

Figure 1:
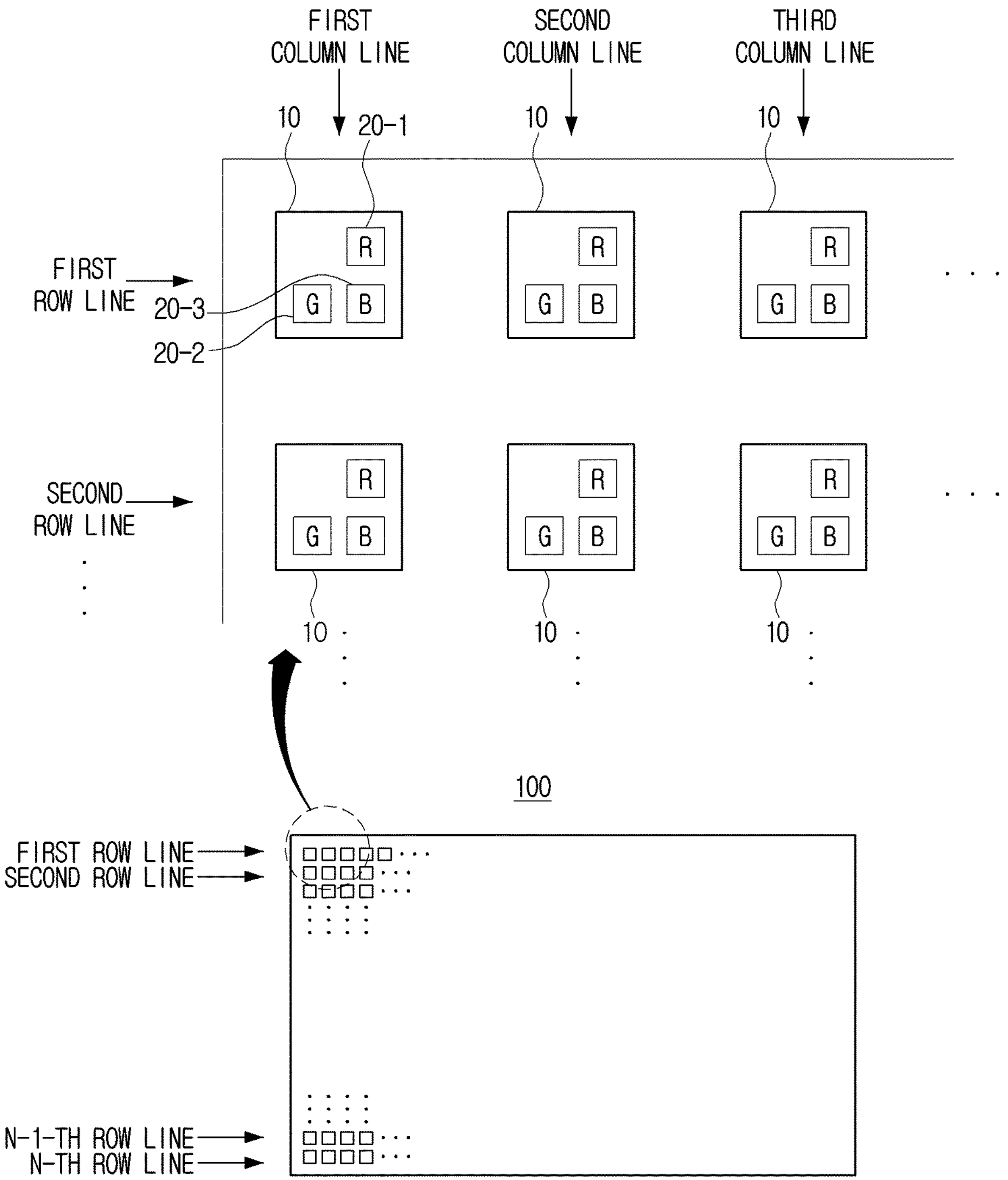
FIG. 1 is a diagram illustrating a pixel structure of a display apparatus according to an embodiment of the disclosure.

FIG. 1 is a diagram illustrating a pixel structure of a display panel according to an embodiment of the disclosure.

Referring to FIG. 1, a display panel 100 may include a plurality of pixels 10 disposed (or arranged) in a matrix form: that is, a pixel array.

The pixel array may define a plurality of row lines and a plurality of column lines. In some cases, a row line may be referred to as a horizontal line or a scan line or a gate line, and a column line may be referred to as a vertical line or a data line.

Alternatively, terms such as a row line, a column line, a horizontal line, and a vertical line may be used as terms for referring to a line on the pixel array, and terms such as a scan line, a gate line, and a data line may be used as terms for referring to a physical line included in the display panel 100 to which data or signals may be transferred.

Each pixel 10 of the pixel array may include three types of sub pixels such as a red (R) sub pixel 20-1, a green (G) sub pixel 20-2, and a blue (B) sub pixel 20-3.

Each pixel 10 may include a plurality of inorganic light emitting devices which form the sub pixels 20-1, 20-2, and 20-3 of the corresponding pixel.

For example, each pixel 10 may include three types of inorganic light emitting devices such as an R inorganic light emitting device which corresponds to the R sub pixel 20-1, a G inorganic light emitting device which corresponds to the G sub pixel 20-2, and a B inorganic light emitting device which corresponds to the B sub pixel 20-3.

Alternatively, each pixel 10 may include three blue inorganic light emitting devices. In this case, a suitable color filter for respectively realizing R, G, and B colors may be provided on a corresponding one of the three inorganic light emitting devices. This color filter may be a quantum dot (QD) color filter, but is not limited thereto.

For convenience, the inorganic light emitting devices and the sub pixels will be referred to interchangeably hereinafter.

Herein, “inorganic light emitting device” may refer to a light emitting device that is manufactured using an inorganic material, for contrast with an organic light emitting diode (OLED) that is manufactured using an organic material.

Specifically, according to an embodiment of the disclosure, the inorganic light emitting device may be a micro light emitting diode (μ-LED) which has a width or diameter less than or equal to 100 micrometers (μm). In this case, the display panel 100 may be a micro LED display panel in which each sub pixel is implemented as a micro LED.

The micro LED display panel may be a flat display panel, and may be formed of a plurality of inorganic light emitting diodes (inorganic LEDs) that are each less than or equal to 100 micrometers. Such a micro LED display panel provides better contrast, faster response rate, and better energy efficiency than a liquid crystal display (LCD) which requires a backlight. Both the organic light emitting diode (organic LED, OLED) and the micro LED may exhibit good energy efficiency, but the micro LED provides a more improved performance than the OLED from a brightness, brightness efficiency, and life-span aspect.

However, in various embodiments, the inorganic light emitting device is not necessarily limited to the micro LED.

Although not shown in the drawings, in the respective sub pixels 20-1, 20-2, and 20-3, a sub pixel circuit for driving the inorganic light emitting device that form the corresponding sub pixel may be provided.

According to an embodiment of the disclosure, the sub pixel circuit may include a constant current generator circuit for pulse amplitude modulation (PAM) driving the inorganic light emitting device by controlling the size of a driving current.

In addition, according to another embodiment of the disclosure, the sub pixel circuit may further include a pulse width modulation (PWM) circuit for driving the inorganic light emitting device by controlling not only the constant current generator circuit, but also a driving time of a driving current.

Specifically, when driving an inorganic light emitting device in a PWM driving method, a variety of grayscales may be expressed by varying the driving time of the driving current, even if a magnitude of the driving current is the same. Accordingly, a problem of a wavelength of light that is emitted by the inorganic light emitting device changing according to the magnitude of the driving current may be avoided, and a better color reproducibility may be realized.

In FIG. 1, the sub pixels 20-1 to 20-3 may be seen as arranged in a left-right reversed L-shape in one pixel 10. However, a disposed form of the sub pixels 20-1 to 20-3 shown therein is merely one example, and the sub pixels may be disposed in various forms in the pixel 10 in various embodiments.

In addition, in the above-described example, an example of the pixel being formed of three types of sub pixels such as R, G, and B have been provided, but is not limited thereto. For example, the pixel may be formed of four types of sub pixels such as R, G, B and white (W). In this case, because the W sub pixel is used in brightness expression of the pixel, there may be a reduction in power consumption compared to a pixel that is formed of three types of sub pixels such as R, G, and B. For convenience of description, an example of when the pixel 10 is formed of the three types of sub pixels such as R, G, and B is provided and described.

Figure 2:
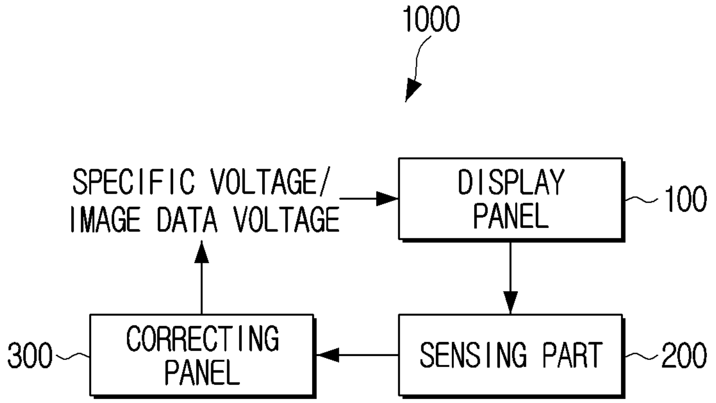
FIG. 2 is a block diagram illustrating a display apparatus according to an embodiment of the disclosure.

FIG. 2 is a block diagram illustrating a display apparatus according to an embodiment of the disclosure. Referring to FIG. 2, a display apparatus 1000 may include the display panel 100, a sensing part 200, and a correcting part 300.

The display panel 100 may include the pixel array as described above in FIG. 1, and may display an image that corresponds to an image data voltage that is applied.

Specifically, the respective sub pixel circuits included in the display panel 100 may provide driving current to the inorganic light emitting devices based on the image data voltage that is applied. As the inorganic light emitting devices each emit light at levels of brightness according to the magnitude of the respective driving current that is provided or the respective driving time, an image may be displayed in the display panel 100.

As described above, because variations in electrical characteristics (e.g., threshold voltage (Vth) and mobility (μ)) are present between driving transistors included in the sub pixel circuits, there is a problem of different driving currents with respect to the same image data voltage being provided to the inorganic light emitting devices.

In various embodiments, the above-described variation may be compensated through an external compensation method. The external compensation method may be a method that involves sensing current that flows through the driving transistors, and compensating the variation in threshold voltage (Vth) and mobility (μ) between the driving transistors by correcting the image data voltage based on the sensing result.

The sensing part 200 may be a component for sensing the current that flows through the driving transistor, and for outputting sensing data that corresponds to the sensed current.

Specifically, when current that is based on a specific voltage flows in the driving transistor, the sensing part 200 may sense the current flowing in the driving transistor and convert to sensing data, and output the converted sensing data to the correcting part 300. Here, the specific voltage may refer to voltage that is applied to the sub pixel circuit separately from the image data voltage to detect the current flowing in the driving transistor.

The correcting part 300 may be a component for correcting the image data voltage that is applied to the sub pixel circuit based on sensing data.

Specifically, the correcting part 300 may calculate or obtain a compensation value for correcting image data based on a look-up table that includes a sensing data value per voltage and sensing data that is output from the sensing part 200.

The look-up table may be pre-stored in various internal or external memories (not shown) of the correcting part 300, and the correcting part 300 may load the look-up table from a memory (not shown) and refer thereto for an applicable sensing data value.

In addition, the correcting part 300 may correct the image data voltage that is applied to the sub pixel circuit, by correcting image data based on the obtained compensation value.

Accordingly, the variation in threshold voltage (Vth) and mobility (μ) between the driving transistors may be compensated.

In various embodiments, the driving transistor may be implemented as a PMOSFET. However, in this case, as described above, the sub pixel circuit may have a cathode common structure and need not compensate a forward voltage variation of the inorganic light emitting device.

Accordingly, according to various embodiments, the forward voltage variation of the inorganic light emitting device may be compensated by using an anode common structure which uses the electrode to which an anode terminal of the inorganic light emitting device is coupled as a common electrode. In addition, a sub pixel circuit structure configured to not only use the anode common structure as described above, but also stably set and maintain data voltage while in operation and a driving method thereof may be provided. A detailed description thereof will be provided below.

Figure 3:
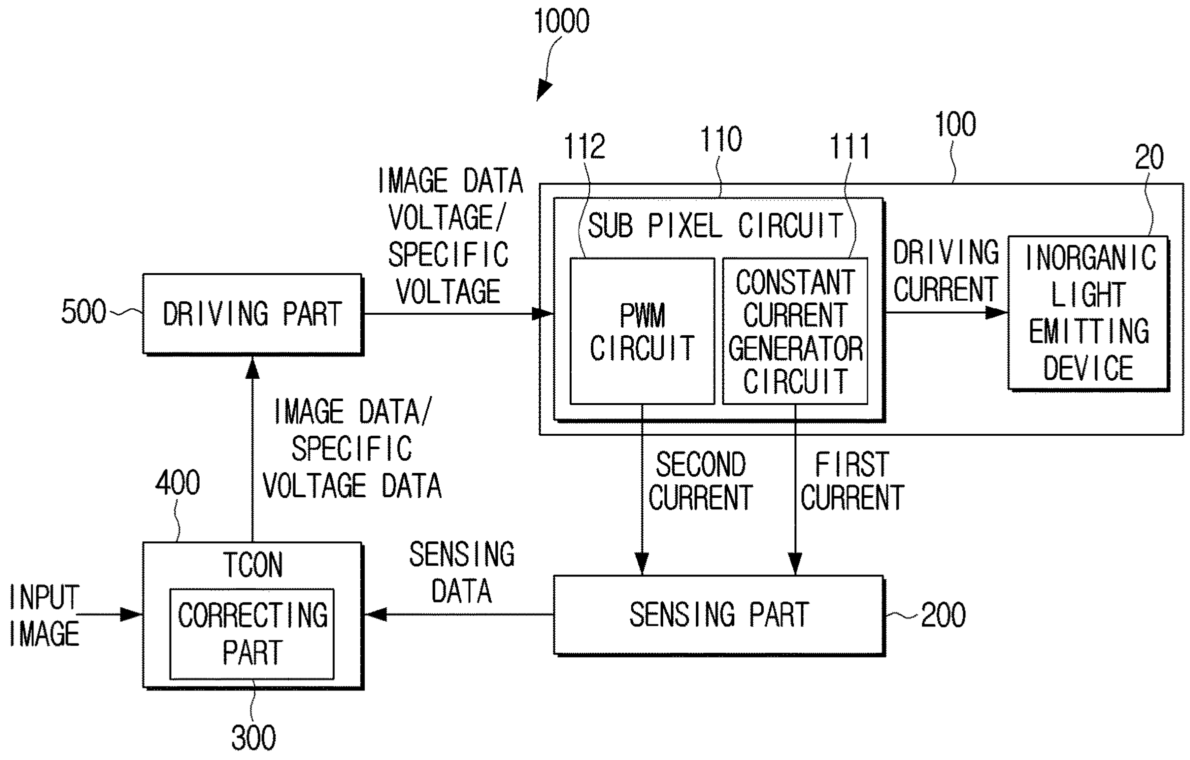
FIG. 3 is a detailed block diagram illustrating a display apparatus according to an embodiment of the disclosure.

FIG. 3 is a block diagram illustrating in greater detail a display apparatus according to an embodiment of the disclosure. Referring to FIG. 3, the display apparatus 1000 may include the display panel 100, the sensing part 200, the correcting part 300, a timing controller 400 (hereinafter, referred to as TCON), and a driving part 500.

The TCON 400 may control the overall operation of the display apparatus 1000. Specifically, the TCON 400 may perform a sensing driving and a display driving of the display apparatus 1000.

The sensing driving may be a driving that updates a compensation value for compensating variation in threshold voltage (Vth) and mobility (μ) of the driving transistors included in the display panel 100, and the display driving may be a driving for displaying an image in the display panel 100 based on the image data voltage in which the compensation value is reflected.

When display driving is performed, the TCON 400 may provide image data on the input image to the driving part 500. The image data provided to the driving part 500 may be image data to which correction is carried out by the correcting part 300.

The correcting part 300 may correct image data on the input image based on a compensation value. The compensation value may be a compensation value obtained through the sensing driving which will be described below. The correcting part 300 may be implemented, as shown in FIG. 3, as a function module of the TCON 400 that is mounted in the TCON 400. However, the disclosure is not limited thereto, and may be mounted in a separate processor that is different from the TCON 400, or implemented as a separate chip in an application specific integrated circuit (ASIC) or a field-programmable gate array (FPGA) method.

The driving part 500 may generate an image data voltage based on image data provided from the TCON 400, and provide the generated image data voltage to the display panel 100. Accordingly, the display panel 100 may display an image based on the image data voltage provided from the driving part 500.

When the sensing driving is performed, the TCON 400 may provide specific voltage data for sensing current that flows in the driving transistor which is included in a sub pixel circuit 110 to the driving part 500.

The driving part 500 may generate a specific voltage corresponding to the specific voltage data and provide the specific voltage to the display panel 100 and thereby, current that is based on the specific voltage may flow in the driving transistor which is included in the sub pixel circuit 110 of the display panel 100.

The sensing part 200 may sense the current flowing in the driving transistor and output sensing data to the correcting part 300, and the correcting part 300 may obtain or update a compensation value for correcting image data based on the sensing data.

Examples of these and related components will be described in greater detail below with respect to FIGS. 4A and 4B.

The display panel 100 may include inorganic light emitting devices 20 each forming a corresponding sub pixel and sub pixel circuits 110 for providing driving current to the inorganic light emitting devices 20. In FIG. 3, only the components associated with one sub pixel (that is, one sub pixel circuit 110 and one inorganic light emitting device 20) have been illustrated for convenience, but it will be understood that such may be provided as described above for each of any number of sub pixels included in the display panel 100.

The inorganic light emitting device 20 may express a variety of grayscales according to either of the magnitude or the driving time of the driving current that is provided from the sub pixel circuit 110. The driving time may also be expressed as a pulse width or duty ratio.

For example, the inorganic light emitting device 20 may express a brighter grayscale value according to a greater magnitude of the driving current. In addition, the inorganic light emitting device 20 may express a brighter grayscale value according to a longer driving time of the driving current (i.e., a longer pulse width or a higher duty ratio).

The sub pixel circuit 110 may provide driving current to the inorganic light emitting device 20 when display driving as described above. Specifically, the sub pixel circuit 110 may provide driving current to the inorganic light emitting device 20 based on the image data voltage (e.g., constant current generator data voltage, PWM data voltage) that is applied from the driving part 500.

That is, the sub pixel circuit 110 may control a brightness of light that the inorganic light emitting device 20 emits by pulse amplitude modulation (PAM) and/or pulse width modulation (PWM) driving the inorganic light emitting device 20.

To this end, the sub pixel circuit 110 may include a constant current generator circuit 111 to provide a constant-current of a certain magnitude to the inorganic light emitting device 20 based on data voltage of a constant current generator.

In addition, the sub pixel circuit 110 may include a PWM circuit 112 to provide constant-current that is provided from the constant current generator circuit 111 to the inorganic light emitting device 20 for a time corresponding to a PWM data voltage. The constant-current that is provided to the inorganic light emitting device 20 may be the driving current.

Although not shown in the drawings, the constant current generator circuit 111 and the PWM circuit 112 may each include the driving transistor. For convenience of description, the driving transistor included in the constant current generator circuit 111 may be referred to as a first driving transistor, and the driving transistor included in the PWM circuit 112 may be referred to as a second driving transistor, below.

When the above-described sensing driving is performed, a first current corresponding to a first specific voltage may flow in the first driving transistor when the first specific voltage is applied to the constant current generator circuit 111, and a second current corresponding to a second specific voltage may flow in the second driving transistor when the second specific voltage is applied to the PWM circuit 112.

Accordingly, the sensing part 200 may sense each of the first current and the second current, and output each of first sensing data corresponding to the first current and second sensing data corresponding to the second current to the correcting part 300. To this end, the sensing part 200 may include a current detector and an analog to digital converter (ADC). The current detector may be realized using a current integrator which includes an operational amplifier (OP-AMP) and a capacitor, but is not limited thereto.

The correcting part 300 may identify a sensing data value corresponding to the first specific voltage from the look-up table that includes the sensing data value per voltage, and compare the identified sensing data value with a first sensing data value that is output from the sensing part 200 and calculate or obtain a first compensation value for correcting a constant current generator data voltage.

In addition, the correcting part 300 may identify a sensing data value corresponding to the second specific voltage from the look-up table that includes the sensing data value per voltage, and compare the identified sensing data value with a second sensing data value that is output from the sensing part 200 and calculate or obtain a second compensation value for correcting the PWM data voltage.

The first and second compensation values obtained as described in the above may be stored or updated in an internal or an external memory (not shown) of the correcting part 300, and then used in the correcting of the image data voltage when the display driving is performed.

Specifically, the correcting part 300 may correct, by correcting image data that is to be provided to the driving part 500 (specifically, a data driver (not shown)) using the compensation value, the image data voltage that is applied to the sub pixel circuit 110.

That is, because the data driver (not shown) is configured to provide the image data voltage that is based on the input image data to the sub pixel circuit 110, the correcting part 300 may correct the image data voltage that is applied to the sub pixel circuit 110 by correcting an image data value.

More specifically, when the display driving is performed, the correcting part 300 may correct a constant current generator data value from among the image data based on the first compensation value. In addition, the correcting part 300 may correct a PWM data value from among the image data based on the second compensation value. Accordingly, the correcting part 300 may correct the constant current generator data voltage and the PWM data voltage that are applied to the sub pixel circuit 110, respectively.

The driving part 500 may drive the display panel 100. Specifically, the driving part 500 may drive the display panel 100 by providing various control signals, data signals, power signals, and the like to the display panel 100.

Specifically, the driving part 500 may include a data driver 510 or source driving part (which will be illustrated and further described below with respect to FIGS. 4A, 4B, 5A, and 7A) for providing the above-described image data voltage or the specific voltage to each sub pixel circuit 110 of the display panel 100. Other suitable source driving parts may also be used, but for convenience a data driver will be assumed going forward. The data driver may include a digital to analog converter (DAC) for converting image data and specific voltage data provided from the TCON 400 to the image data voltage and the specific voltage, respectively.

In addition, the driving part 500 may include at least one scan driver 520 (which will be illustrated and further described below with respect to FIGS. 4A and 4B) that provides various control signals for driving the pixel array of the display panel 100 in a unit of at least one row line. A gate driver may also be used, but for convenience a scan driver will be assumed going forward.

In addition, the driving part 500 may include a MUX circuit (not shown) for selecting a plurality of sub pixels of different colors, respectively, that form the pixel 10.

In addition, the driving part 500 may include a driving voltage providing circuit (not shown) for providing various driving voltages (e.g., first driving voltage (VDD_CCG), second driving voltage (VDD_PWM), ground voltage (VSS), and the like which will be further described below) to each sub pixel circuit 110 included in the display panel 100.

In addition, the driving part 500 may include a clock signal providing circuit (not shown) which provides various clock signals for driving the scan driver 520 or the data driver 510, and include a sweep voltage providing circuit (not shown) for providing sweep voltage which will be described below.

Part or all of the above-described driving part 500 may be implemented, in various embodiments, in a separate chip form and mounted in an external printed circuit board (PCB) together with the TCON 400, and coupled with the sub pixel circuits 110 formed at a thin-film transistor (TFT) layer of the display panel 100 through a film on glass (FOG) wiring.

Alternatively, part or all of the above-described driving part 500 may be implemented, in various embodiments, in a separate chip form and disposed on a film in a chip on film (COF) form, and coupled with the sub pixel circuits 110 formed at the TFT layer of the display panel 100 through the film on glass (FOG) wiring.

Alternatively, part or all of the above-described driving part 500 may be implemented, in various embodiments, in a separate chip form and disposed in a chip on glass (COG) form (i.e., disposed at a back surface (opposite surface of a surface to which the TFT layer is formed based on a glass substrate (described below)) of the glass substrate of the display panel 100), and coupled with the sub pixel circuits 110 formed at the TFT layer of the display panel 100 through a connection wiring.

Alternatively, part or all of the above-described driving part 500 may be coupled, in various embodiments, with the sub pixel circuits 110 by being formed at the TFT layer together with the sub pixel circuits 110 in the display panel 100.

As one example, the scan driver, the sweep voltage providing circuit, and the MUX circuit of the above-described driving part 500 may be formed within the TFT layer of the display panel 100, the data driver may be disposed at the back surface of the glass substrate of the display panel 100, the driving voltage providing circuit, the clock signal providing circuit, and the TCON 400 may be disposed at an external printed circuit board (PCB). However, the disclosure is not limited thereto.

In FIG. 3, an embodiment of both the constant current generator circuit 111 and the PWM circuit 112 being included in the sub pixel circuit 110 has been illustrated, but the disclosure is not limited thereto. For example, in another embodiment of the disclosure, the sub pixel circuit 110 may include only the constant current generator circuit 111.

In the above, to avoid redundant description, an example of the sub pixel circuit 110 including both the constant current generator circuit 111 and the PWM circuit 112 has been described, based on the embodiment illustrated in FIG. 3, but the disclosure is not limited thereto. For example, the description associated with the PWM circuit 112 may be omitted, and the remainder of the above-described description may be applied as-is, to provide an embodiment of the sub pixel circuit 110 which includes only the constant current generator circuit 111.

Figure 4A:
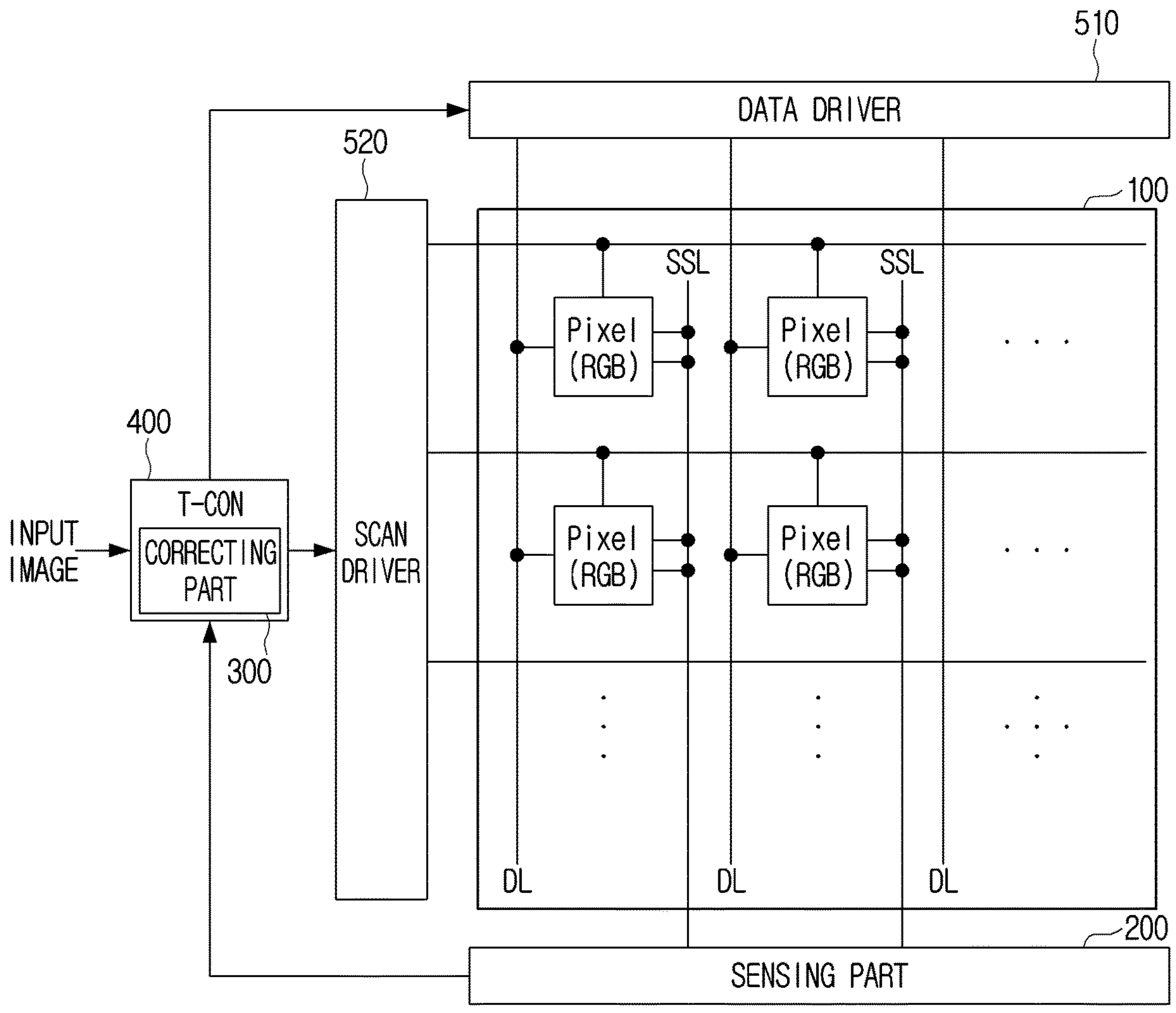
FIG. 4A is a diagram illustrating an example of a sensing part according to an embodiment of the disclosure.
Figure 4B:
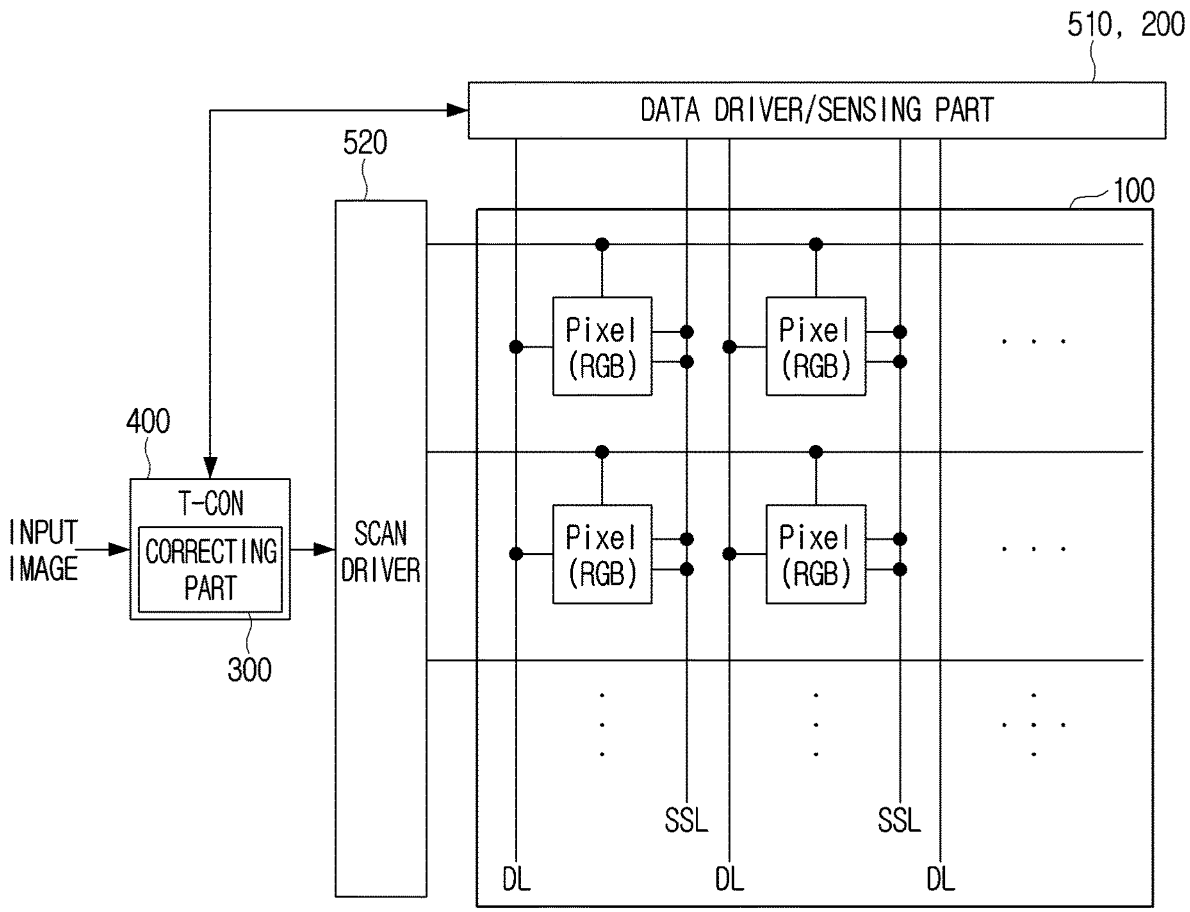
FIG. 4B is a diagram illustrating an example of a sensing part according to another embodiment of the disclosure.

FIG. 4A and FIG. 4B are diagrams illustrating examples of a sensing part 200, according to embodiments of the disclosure. Referring to FIG. 4A and FIG. 4B, the display panel 100 may include the plurality of pixels disposed at each area at which a plurality of data lines (DL) and a plurality of scan lines (SCL) intercross in a matrix form.

Each pixel may include three sub pixels such as R, G, and B, and each sub pixel included in the display panel 100 may include inorganic light emitting devices 20 of the corresponding colors and the sub pixel circuit 110 as described above.

Here, the data line (DL) may be a line for applying the above-described image data voltage (specifically, the constant current generator data voltage and the PWM data voltage) and the specific voltage to each sub pixel included in the display panel 100, and the scan line (SCL) may be a line for selecting the pixels (or sub pixels) included in the display panel 100 for each row line.

Accordingly, the image data voltage or the specific voltage applied from the data driver 510 through the data line (DL) may be applied to a pixel (or sub pixel) in the row line selected through a control signal (e.g., SPWM(n), SCCG(n), and the like which will be described below) that is applied from the scan driver 520.

The voltages (the image data voltage and the specific voltage) to be applied to each of the R, G, and B sub pixels may be time division multi-flexed and applied to the display panel 100. The time division multi-flexed voltages as described above may be respectively applied to a corresponding sub pixel through the MUX circuit (not shown).

According to an embodiment and unlike FIG. 4A and FIG. 4B, a separate data line may be provided for each of the R, G, and B sub pixels, and in this case, the voltages (the image data voltage and the specific voltage) to be applied to each of the R, G, and B sub pixels may be simultaneously applied to the corresponding sub pixel through the corresponding data line. In this case, the MUX circuit (not shown) may be omitted.

The same may be applicable for a sensing line (SSL). That is, according to an embodiment of the disclosure, the sensing line (SSL) may be provided for each column line of the pixel as shown in FIG. 4A and FIG. 4B. In this case, the MUX circuit (not shown) may be included in an operation of the sensing part 200 for each of the R, G, and B sub pixels.

According to another embodiment of the disclosure, unlike FIG. 4A and FIG. 4B, the sensing line (SSL) may be provided in a column line unit in the sub pixel. In this case, a separate MUX circuit (not shown) may be omitted in an operation of the sensing part 200 for each of the R, G, and B sub pixels. However, compared to the embodiment shown in FIG. 4A and FIG. 4B, a plurality of sensing parts 200, such as described below, may be included.

In FIG. 4A and FIG. 4B, for convenience of illustration, only one scan line for one row line has been shown. However, a number of actual scan lines may vary according to a driving method or embodiment of the pixel circuits 110 included in the display panel 100. For example, a plurality of scan lines for providing each of the control signals (SPWM(n), SCCG(n), Emi, Sweep, PWM_Sen(n), CCG_Sen(n), etc.) shown in FIG. 5A and FIG. 7A may be provided for each row line.

The first current and the second current that flows in the first and second driving transistors based on the specific voltage as described above may be transferred to the sensing part 200 through the sensing line (SSL). Accordingly, the sensing part 200 may sense each of the first current and the second current, and output first sensing data that corresponds to the first current and second sensing data that corresponds to the second current to the correcting part 300, respectively.

According to an embodiment of the disclosure, the sensing part 200 may be implemented as an integrated circuit (IC) separate from the data driver 510, as shown in FIG. 4A. According to an alternative embodiment of the disclosure, the sensing part 200 may be implemented as one IC together with the data driver 510, as shown in FIG. 4B.

As described above, the correcting part 300 may correct the constant current generator data voltage based on the first sensing data output from the sensing part 200, and correct the PWM data voltage based on the second sensing data.

In FIG. 4A and FIG. 4B, an example of the first current and second current being transferred to the sensing part 200 through the sensing line (SSL) separate from the data line (DL) has been provided. However, the disclosure is not limited thereto. For example, an example of the first current and the second current being transferred to the sensing part 200 through the data line (DL) without the sensing line (SSL) may be applicable to the example of the data driver 510 and the sensing part 200 being implemented as one IC as in FIG. 4B.

Referring to FIG. 5A to FIG. 8E, an embodiment of the sub pixel circuit 110 including only the constant current generator circuit 111 and not the PWM circuit 112 will be described in detail below.

Figure 5A:
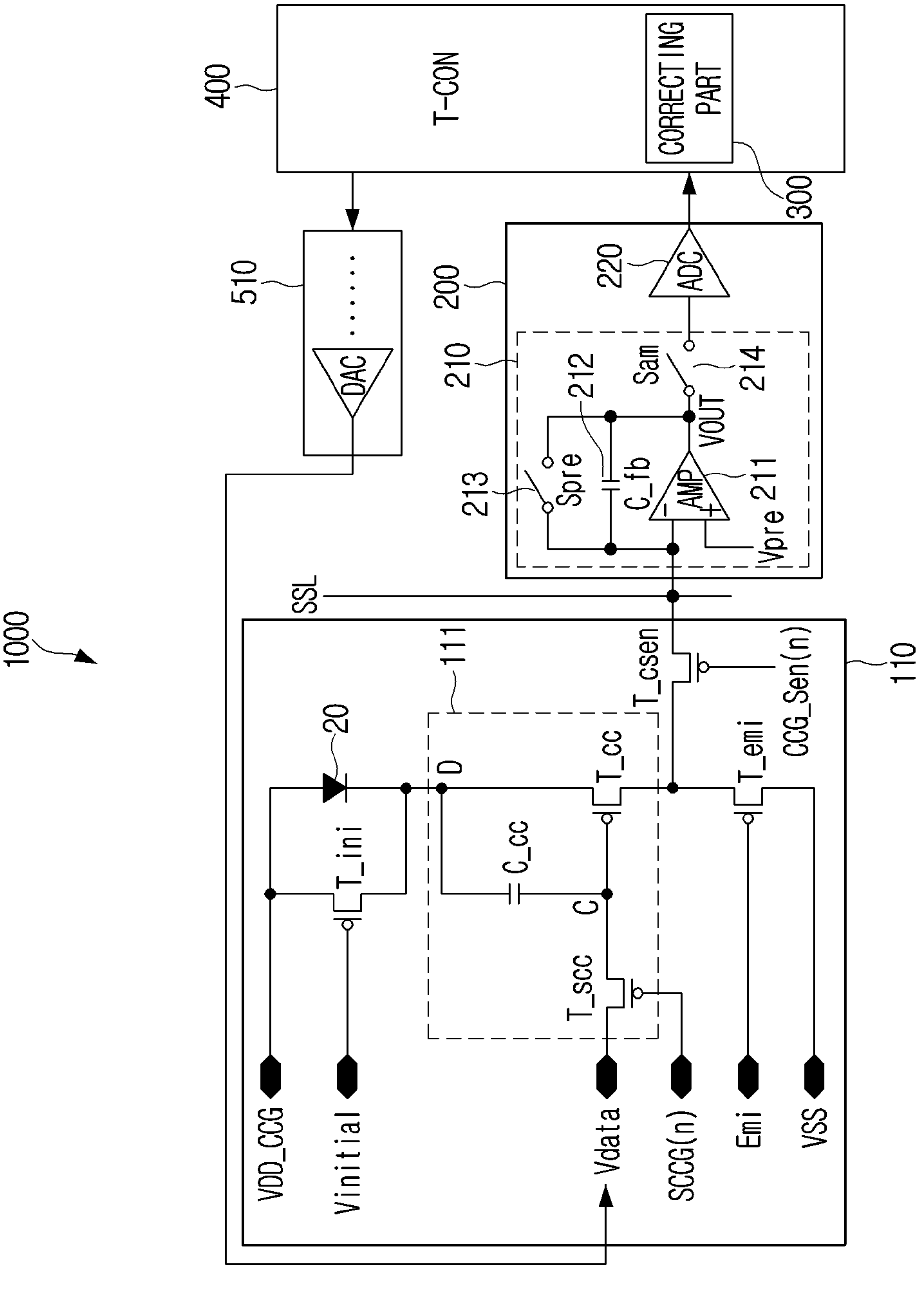
FIG. 5A is a detailed circuit diagram illustrating a sub pixel circuit and a sensing part according to an embodiment of the disclosure.

FIG. 5A is a detailed circuit diagram illustrating the sub pixel circuit 110 and the sensing part 200 according to an embodiment of the disclosure. In FIG. 5A, the data driver 510, the correcting part 300, and the TCON 400 have been shown together for convenience in understanding.

FIG. 5A illustrates in detail a circuit associated with one sub pixel, that is, one inorganic light emitting device 20, the sub pixel circuit 110 for driving the inorganic light emitting device 20, and the unit configurations of the sensing part 200 for sensing current that flows in the driving transistor (T_cc) included in the sub pixel circuit 110.

Referring to FIG. 5A, the sub pixel circuit 110 may include the constant current generator circuit 111 and four transistors (T_emi, T_psen, T_psen, and T_ini).

The constant current generator circuit 111 may include the driving transistor (T_cc) by which a source terminal is coupled with a cathode terminal of the inorganic light emitting device, a capacitor (C_cc) coupled between the source terminal and a gate terminal of the driving transistor (T_cc), and a transistor (T_scc) that is controlled to turn on or turn off according to a control signal SCCG(n) and configured to apply the constant current generator data voltage that is applied from the data driver 510 while in a turned-on state to the gate terminal of the driving transistor (T_cc).

The transistor (T_emi) may be turned on or turned off according to a control signal Emi, the source terminal may be coupled to a drain terminal of the driving transistor (T_cc), and the drain terminal may be coupled to a ground voltage terminal.

The transistor (T_csen) may be configured such that the source terminal is coupled to the drain terminal of the transistor (T_cc), and the drain terminal is coupled to the sensing part 200. The transistor (T_psen) may be turned on according to a control signal CCG_Sen(n) while sensing driving is being performed, and may transfer the current flowing in the driving transistor (T_cc) to the sensing part 200 through the sensing line (SSL).

The transistor (T_ini) may be coupled to both ends of the inorganic light emitting device 20. Specifically, the source terminal of the transistor (T_ini) may be connected in common to an anode terminal of the inorganic light emitting device 20 with a driving voltage terminal, and the drain terminal may be connected in common to a cathode terminal of the inorganic light emitting device 20 with the source terminal of the driving transistor (T_cc).

The transistor (T_ini) may be turned on according to a control signal Vinitial while the constant current generator data voltage or the specific voltage is being applied to the sub pixel circuit 110 and may transfer a driving voltage (VDD_CCG) to the source terminal of the driving transistor (T_cc). In addition, the driving current in a light emitting interval may be turned off according to the control signal Vinitial so as to flow in the inorganic light emitting device 20.

The anode terminal of the inorganic light emitting device 20 may be coupled with the driving voltage terminal to which the driving voltage (VDD_CCG) is applied. The driving voltage terminal may be the common electrode. Accordingly, according to an embodiment of the disclosure, the display panel 100 may have an anode common structure by which the anode terminal of all inorganic light emitting devices 20 is coupled to a common anode electrode.

According to FIG. 5A, the unit configurations of the sensing part 200 may include a current integrator 210 and an ADC 220. Specifically, according to an embodiment of the disclosure, the current integrator 210 may include an amplifier 211, an integration capacitor 212, a first switch 213, and a second switch 214.

The amplifier 211 may include an inverting input terminal (−) which is coupled to the sensing line (SSL) and configured to receive input of current that flows in the driving transistor (T_cc) through the sensing line (SSL), a non-inverting input terminal (+) configured to receive input of a reference voltage (Vpre), and an output terminal (Vout).

In addition, the integration capacitor 212 (also labeled C_fb in the figures) may be coupled between the inverting input terminal (−) and the output terminal (Vout) of the amplifier 211, and the first switch 213 may be coupled to both ends of the integration capacitor 212. The second switch 214 may be configured such that first and second ends thereof are respectively coupled to input ends of the output terminal (Vout) of the amplifier 211 and the ADC 220, and may be switched according to a control signal Sam.

The unit configurations of the sensing part 200 shown in FIG. 5A may be provided for each sensing line (SSL). Accordingly, when the sensing line is provided for each column line of the pixel in the display panel 100 that includes, for example, 480 pixel column lines, the sensing part 200 may include 480 unit configurations described above.

Based on each pixel including the R, G, and B sub pixels, if the sensing line is provided for each column line of the sub pixel in the display panel 100 that includes the 480 pixel column lines, the sensing part 200 may include 1440 (=480*3) unit configurations described above.

Figure 5B:
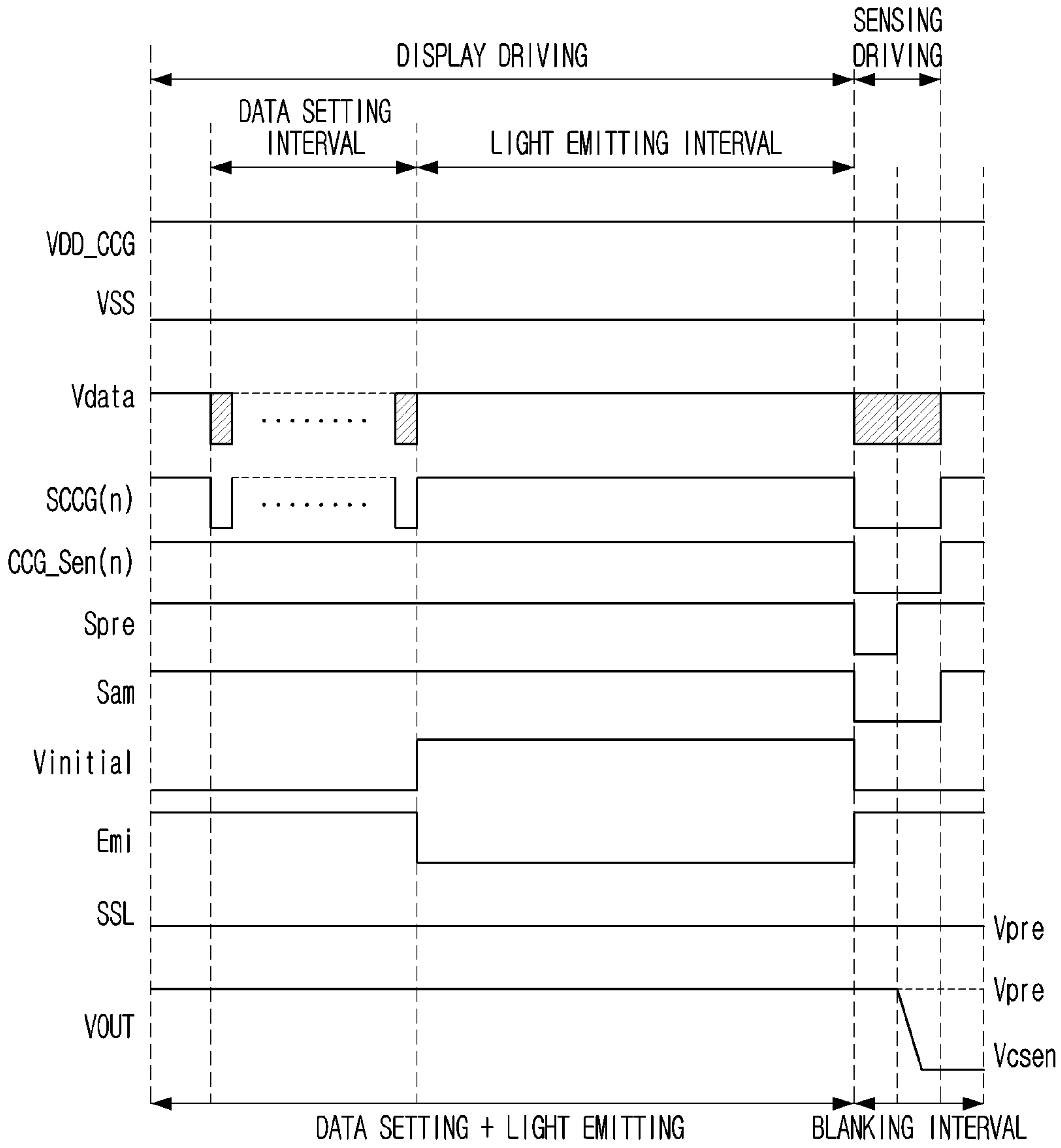
FIG. 5B is a driving time diagram illustrating timing behavior of a display apparatus according to an embodiment of the disclosure.

FIG. 5B is a driving time diagram illustrating timing behavior of the display apparatus 1000 according to an embodiment of the disclosure. Specifically, FIG. 5B shows the various control signals, driving voltage signals, and data signals that are applied to the sub pixel circuits 110 included in the display panel 100 for one image frame period.

Referring to FIG. 5B, the display panel 100 may be driven in the display driving and the sensing driving order for one image frame period.

A display driving interval may include a data setting interval and a light emitting interval.

During the display driving interval, the corresponding image data voltage, that is, the constant current generator data voltage may be applied and set in each sub pixel circuit 110 of the display panel 100. Then, in the light emitting interval, each sub pixel circuit 110 may provide driving current to the inorganic light emitting device 20 based on the image data voltage set during the data setting interval, and accordingly, an image may be displayed as the inorganic light emitting devices 20 emit light.

During the data setting interval, the constant current generator data voltage that is applied from the data driver 510 may be set in the constant current generator circuit 111 (specifically, a gate terminal (C node) of the driving transistor (T_cc)) of the sub pixel circuit 110. The constant current generator data voltage may be applied from the data driver 510 in a row line order of the pixel array, and set in the row line order in the constant current generator circuit 111. That is, the n in the parenthesis from the control signal SCCG(n) in FIG. 5B may represent a number of the row line.

The light emitting interval may be an interval at which the inorganic light emitting devices 20 of each sub pixel proceed to collectively emit light based on the constant current generator data voltage set in the data setting interval.

In a sensing driving interval, the specific voltage may be applied to the sub pixel circuit 110 from the data driver 510, and the sensing part 200 may sense the current flowing in the driving transistor (T_cc) based on the specific voltage and output sensing data.

As shown in FIG. 5B, the sensing driving may be performed within a blanking interval (specifically, a vertical blanking interval) from among the one image frame period. The vertical blanking interval may refer to a time interval at which effective image data is not input in the display panel 100.

However, the disclosure is not limited thereto. For example, the sensing driving may be performed during a booting period, a power off period, a screen off period, or the like of the display apparatus 1000. Here, the booting period may mean a period after system power is applied and before a screen is turned on, the power off period may mean a period after the screen is turned off and before the system power is de-powered, and the screen off period may mean a period at which the system power is being applied but the screen is turned off.

An operation of the display apparatus 1000 will be described in greater detail below with reference to FIG. 6A to FIG. 6C.

Figure 6A:
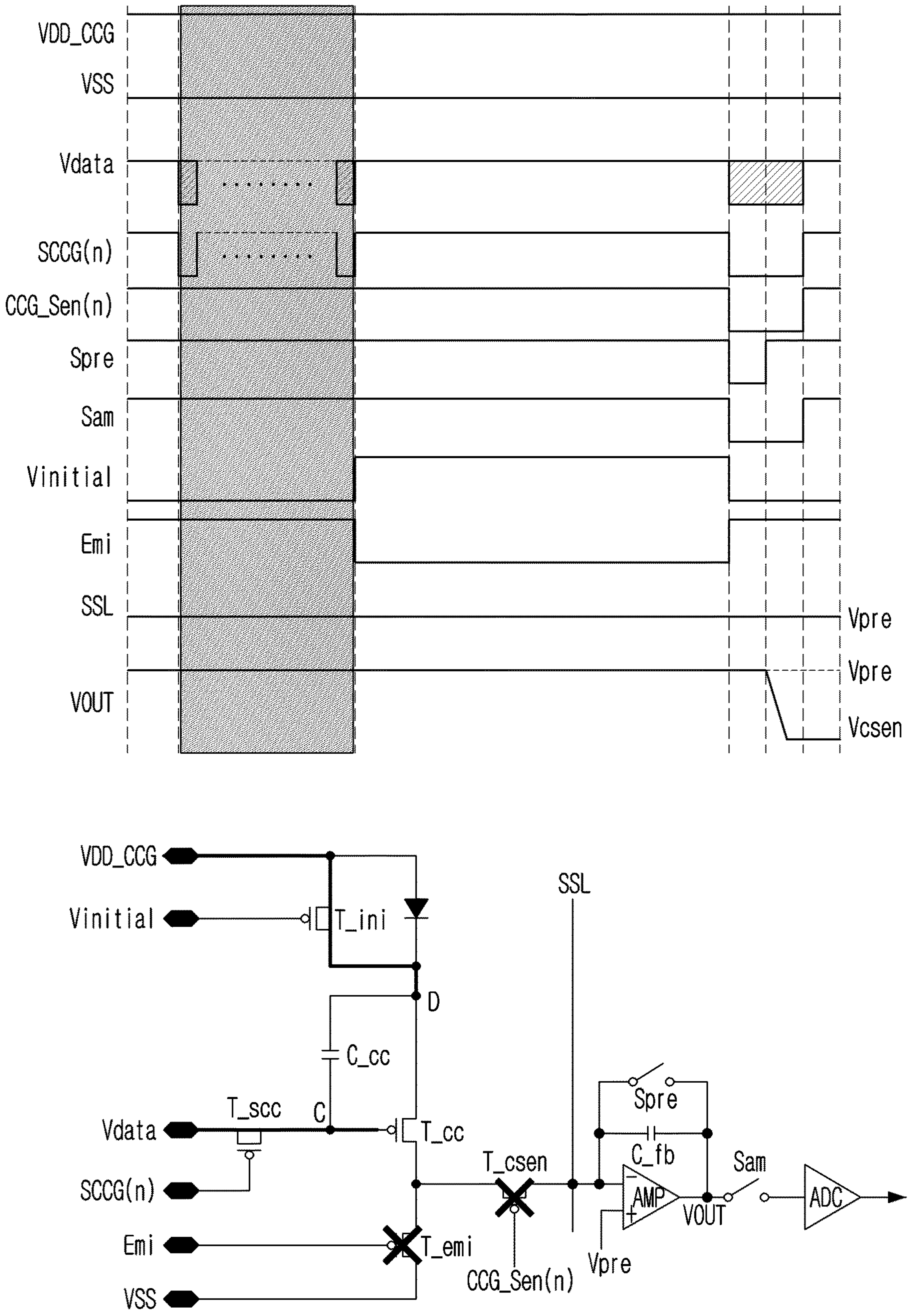
FIG. 6A is a diagram illustrating an operation of a sub pixel circuit during a data setting interval according to the embodiment of FIG. 5B.

FIG. 6A is a diagram illustrating an operation of the sub pixel circuit 110 during the data setting interval, according to the embodiment of FIG. 5B. During the data setting interval, the constant current generator data voltage may be set in the constant current generator circuit 111.

Specifically, during the data setting interval, the constant current generator data voltage from the data driver 510 may be applied to a data signal line (Vdata). The transistor (T_scc) may be turned on according to the control signal SCCG(n), and the constant current generator data voltage may be input (or set) in the gate terminal (hereinafter, referred to as a 'C node') of the driving transistor (T_cc) through the turned-on transistor (T_scc).

During the data setting interval, the transistor (T_ini) may be in a turned-on state according to a control signal Vinitial. Accordingly, the driving voltage (VDD_CCG) may be input to the source terminal (D node) of the driving transistor (T_cc) through the turned-on transistor (T_ini).

Finally, during the data setting interval, a voltage corresponding to a difference in the driving voltage (VDD_CCG) and the constant current generator data voltage may be set between the source terminal and the gate terminal (that is, at both ends of the capacitor (C_cc)) of the driving transistor (T_cc).

The constant current generator data voltage may be a voltage within a voltage range of less than a sum of the driving voltage (VDD_CCG) and a threshold voltage (Vth_cc) of the driving transistor (T_cc). Accordingly, the driving transistor (T_cc) may be in a turned-on state while the constant current generator data voltage is set in the C node.

The setting operation for the constant current generator data voltage described above may be carried out, based on the display panel 100 being formed of, for example, 270 row lines, in the respective row line order repeated 270 times.

Figure 6B:
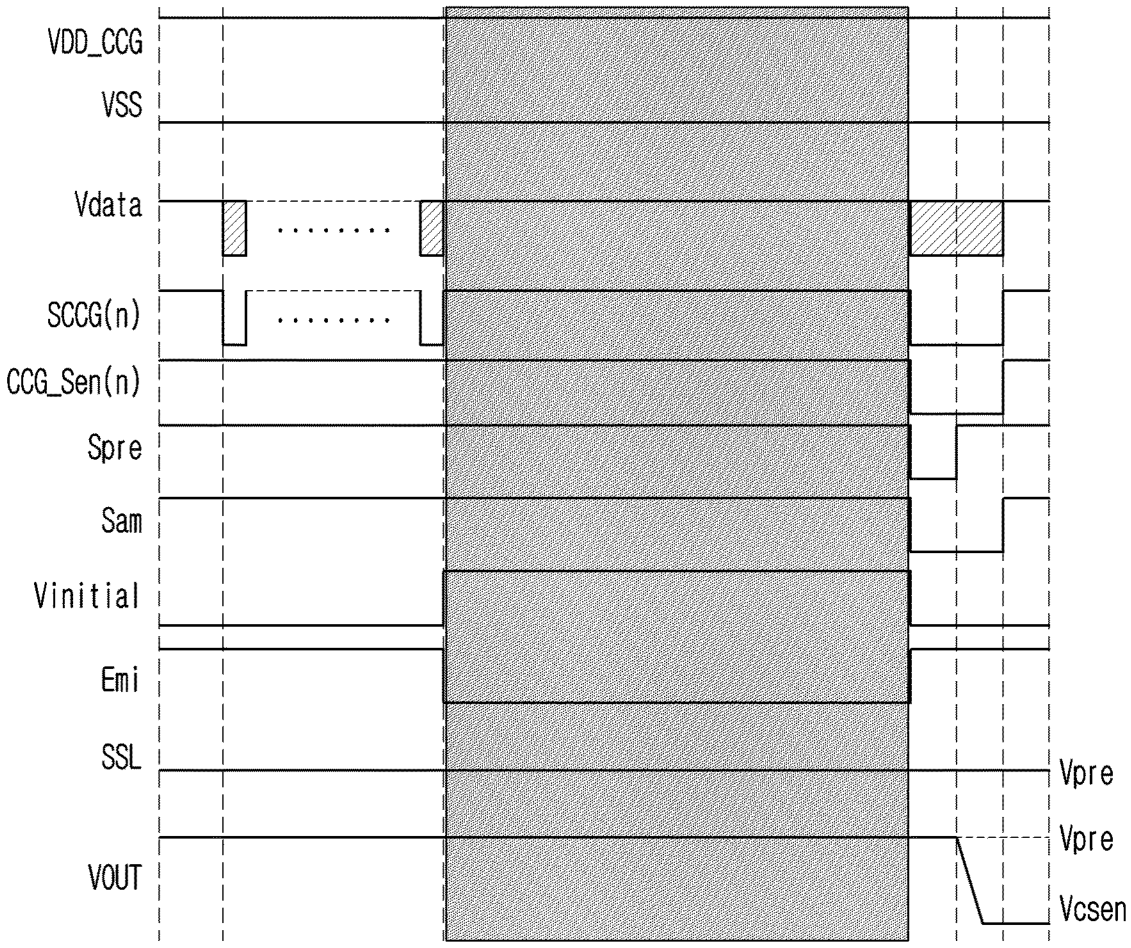
FIG. 6B is a diagram illustrating an operation of a sub pixel circuit during a light emitting interval according to the embodiment of FIG. 5B.
Figure 6B:
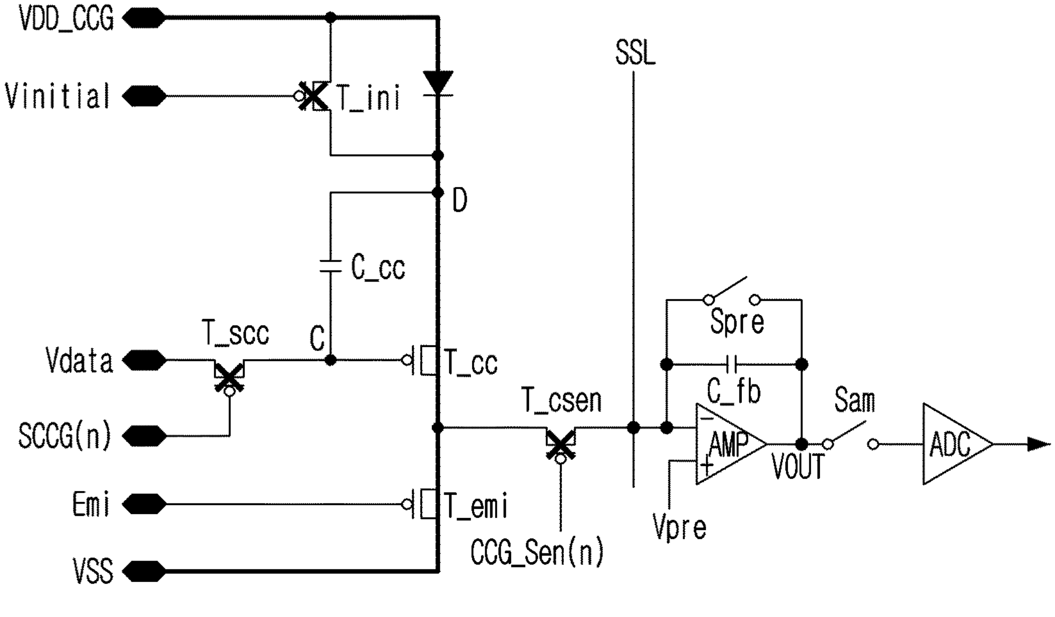

FIG. 6B is a diagram illustrating an operation of the sub pixel circuit 110 during the light emitting interval, according to the embodiment of FIG. 5B.

When the light emitting interval is started, the transistor (T_emi) may be turned on according to the control signal Emi, and may maintain the turned-on state during the light emitting interval. In addition, as described above in FIG. 6A, the driving transistor (T_cc) may be in the turned-on state while the constant current generator data voltage is set in the C node. In addition, the transistor (T_ini) may be in the turned-off state according to the control signal Vinitial during the light emitting interval.

Accordingly, when the light emitting interval is started, the driving current may flow through the inorganic light emitting device 20, the driving transistor (T_cc), and the transistor (T_emi), and the inorganic light emitting device 20 may begin emitting light. The magnitude of the driving current may be determined according to a magnitude of voltage applied between the gate terminal (C node) and the source terminal (D node) of the driving transistor (T_cc).

When the driving current flows in the inorganic light emitting device 20, a forward voltage drop may occur at both ends of the inorganic light emitting device 20. Accordingly, the voltage of the D node in the light emitting interval may be lower in the data setting interval.

However, because the voltage of the C node is also dropped by a level substantially equal to the voltage dropped from the D node through the capacitor (C_cc), the voltage applied between the gate terminal and the source terminal of the driving transistor (T_cc) may be identically maintained in the data setting interval and the light emitting interval.

Accordingly, according to an embodiment of the disclosure, the forward voltage variation of the inorganic light emitting device 20 may be naturally compensated during an operation of the sub pixel circuit 110 while using the anode common structure.

Figure 6C:
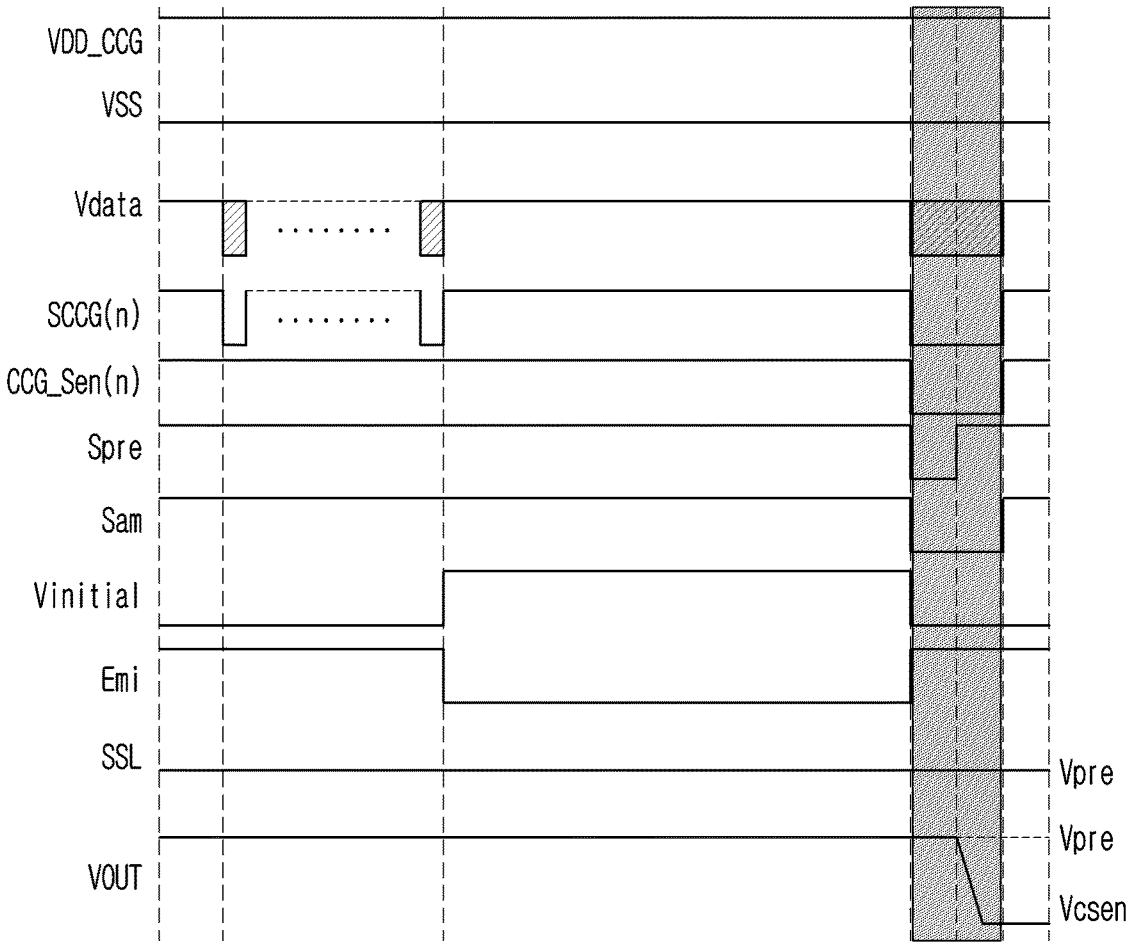
FIG. 6C is a diagram illustrating an operation of a sub pixel circuit and a driving part during a sensing driving interval according to the embodiment of FIG. 5B.
Figure 6C:
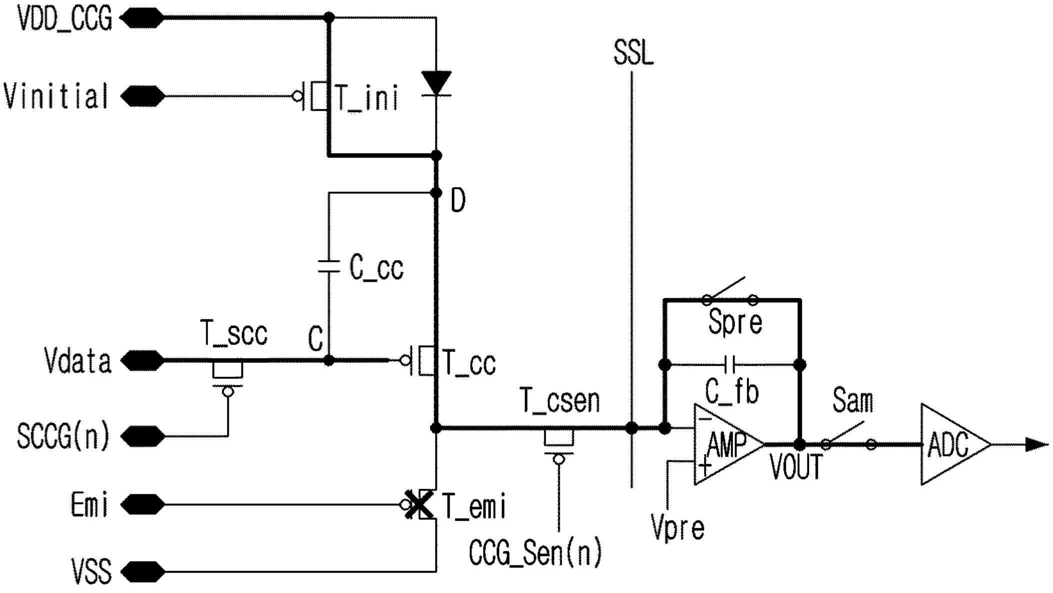

FIG. 6C is a diagram illustrating an operation of the sub pixel circuit 110 and the driving part 500 during the sensing driving interval, according to the embodiment of FIG. 5B.

In the sensing driving interval, the specific voltage from the data driver 510 may be applied to the data signal line (Vdata). The transistor (T_cc) may be turned on according to the control signal SCCC(n), and the specific voltage may be input in the C node through the turned-on transistor (T_cc). Here, the specific voltage may be any preset voltage for turning on the driving transistor (T_cc).

In the sensing driving interval, the transistor (T_csen) may be turned on according to the control signal CCG_Sen (n), and current flowing in the driving transistor (T_cc) may be transferred to the sensing part 200 through the turned-on transistor (T_csen).

During the sensing driving interval, the first switch 213 of the sensing part 200 may be turned on and turned off according to a control signal Spre. In the sensing driving interval, a period in which the first switch 213 is turned on may be referred to as an initialization period and a period in which the first switch 213 is turned off may be referred as a sensing period and described below.

Because the first switch 213 is in a turned-on state during the initialization period, the reference voltage (Vpre) that is input to the non-inverting input terminal (+) of the amplifier 211 may be maintained in the output terminal (Vout) of the amplifier 211.

Because the first switch 213 is turned off during the sensing period, the amplifier 211 may operate as the current integrator and integrate the current that is input. A voltage difference at both ends of the integration capacitor 212 may increase as sensing time progresses, that is, as a charge amount that is accumulated increases by the current that is introduced to the inverting input terminal (−) of the amplifier 211 during the sensing period.

However, due to properties of a virtual ground of the amplifier 211, because the voltage of the inverting input terminal (−) in the sensing period is maintained at the reference voltage (Vpre) regardless of an increase in voltage difference of the integration capacitor 212, the voltage of the output terminal (Vout) of the amplifier 211 may be lowered to correspond to the voltage difference at both ends of the integration capacitor 212.

Based on the principle above, the current that is introduced to the sensing part 200 during the sensing period may be accumulated as an integrated value Vpsen, which is a voltage value, through the integration capacitor 212. Because a falling slope of the voltage of the output terminal (Vout) of the amplifier 211 increases as the current that is input is greater, a magnitude of the integrated value Vpsen may become smaller as the current being input is greater.

The integrated value Vpsen may be input to the ADC 220 while the second switch 214 is maintained in the turned-on state during the sensing period, and output to the correcting part 300 after being converted to sensing data from the ADC 220.

Accordingly, as described above, the correcting part 300 may obtain respective compensation values based on the sensing data, and store or update the obtained compensation value in the memory (not shown).

Then, when the display driving is being performed, the correcting part 300 may correct the constant current generator data voltage to be applied to the sub pixel circuit 110 based on the compensation value. Accordingly, a variation in electrical properties between the driving transistors (T_cc) may be compensated.

According to an embodiment of the disclosure, the specific voltage may be applied to the sub pixel circuits that correspond to one row line per one image frame. That is, according to an embodiment of the disclosure, the above-described sensing driving may be performed with respect to one row line per one image frame. The above-described sensing driving may proceed in the row line order.

Accordingly, if the display panel 100 is formed of, for example, 270 row lines, the above-described sensing driving may be performed for the sub pixel circuits included in a 1st row line with respect to a 1st image frame, and the above-described sensing driving may be performed for the sub pixel circuits included in a 2nd row line with respect to a 2nd image frame.

In the method described above, based on the sensing driving being performed for the pixel circuits included in the 270th row line with respect to the 270th image frame, the sensing driving for all the sub pixel circuits included in the display panel 100 may be completed one time.

According to another embodiment of the disclosure, the specific voltage may be applied to the sub pixel circuits that correspond to the plurality of row lines per one image frame. That is, according to an embodiment of the disclosure, the above-described sensing driving may be performed for the plurality of row lines per one image frame. The above-described sensing driving may proceed in the row line order.

Accordingly, assuming that the display panel 100 includes, for example, 270 row lines, and that the above-described sensing driving is performed for three row lines per one image frame, the above-described sensing driving may be performed for the sub pixel circuits included in 1st to 3rd row lines with respect to the 1st image frame, and the above-described sensing driving may be performed for the sub pixel circuits included in 4th to 6th row lines with respect to the 2nd image frame.

In the method described above, based on the above-described sensing driving being performed for the sub pixel circuits included in the 268th to 270th row lines with respect to a 90th image frame, the sensing driving for all the sub pixel circuits included in the display panel 100 may be completed one time. Accordingly, in this case, when the driving for the 270th image frame is completed, the above-described sensing driving for all the sub pixel circuits included in the display panel 100 may be completed three times.

In the above, the sensing driving being carried after the display driving has been provided as an example, but is not limited thereto, and the sensing driving may be carried out first according to an embodiment, and the display driving may be carried out thereafter.

An embodiment of the sub pixel circuit 110 including both the constant current generator circuit 111 and the PWM circuit 112 will be described in detail below with reference to FIG. 7A to FIG. 8E.

Figure 7A:
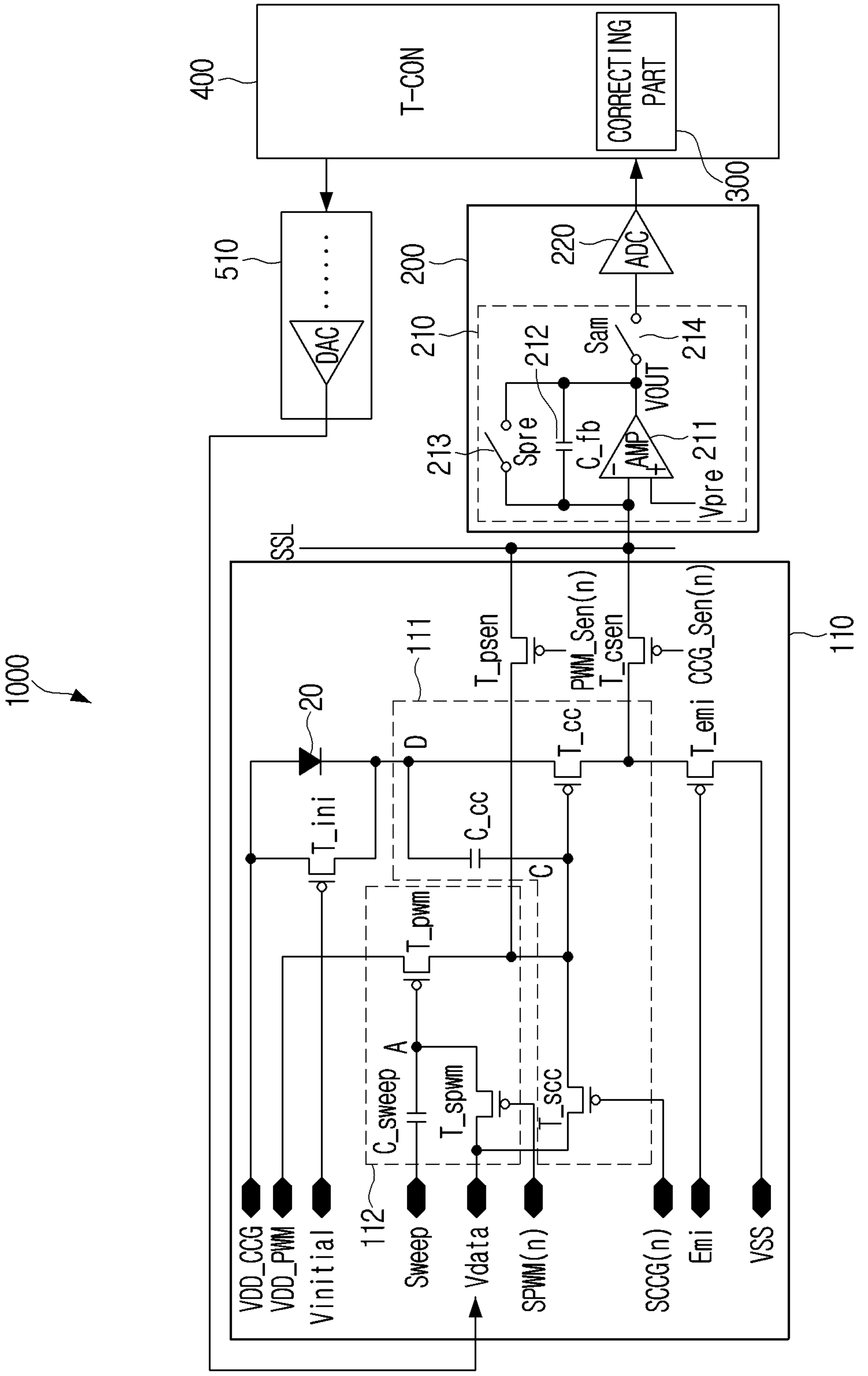
FIG. 7A is a detailed circuit diagram illustrating a sub pixel circuit and a sensing part according to another embodiment of the disclosure.

FIG. 7A is a detailed circuit diagram illustrating the sub pixel circuit 110 and the sensing part 200 according to an embodiment of the disclosure. In FIG. 7A, the data driver 510, the correcting part 300, and the TCON 400 have been shown together for convenience in understanding.

FIG. 7A shows in detail a circuit associated with one sub pixel, that is, one inorganic light emitting device 20, the sub pixel circuit 110 for driving the inorganic light emitting device 20, and unit configurations of the sensing part 200 for sensing current flowing in the driving transistors (T_cc, T_pwm) included in the sub pixel circuit 110.

According to FIG. 7A, the sub pixel circuit 110 may include the constant current generator circuit 111, the PWM circuit 112, the transistor (T_emi), the transistor (T_csen), the transistor (T_psen), and the transistor (T_ini).

The constant current generator circuit 111 may include a first driving transistor (T_cc) by which the source terminal is coupled with the cathode terminal of the inorganic light emitting device 20, the capacitor (C_cc) coupled between a source terminal and a gate terminal of the first driving transistor (T_cc), and the transistor (T_scc) that is controlled to turn on or turn off according to the control signal SCCG(n) and configured to apply the constant current generator data voltage that is applied from the data driver 510 while in the turned-on state to the gate terminal of the first driving transistor (T_cc).

The PWM circuit 112 may include a second driving transistor (T_pwm) by which the source terminal is coupled with a driving voltage (VDD_PWM) terminal, a capacitor (C_sweep) for coupling sweep voltage that changes linearly to a gate terminal of the second driving transistor (T_pwm), and a transistor (T_spwm) that is controlled to turn on or turn off according to a control signal SPWM(n) and configured to apply the PWM data voltage that is applied from the data driver 510 while in the turned-on state to the gate terminal of the second driving transistor (T_pwm).

A drain terminal of the second driving transistor (T_pwm), which may be termed a second drain terminal, may be coupled with the gate terminal of the first driving transistor (T_cc).

The transistor (T_emi) may be turned on or turned off according to the control signal Emi, the source terminal may be coupled to the drain terminal of the first driving transistor (T_cc), which may be termed a first drain terminal, and the drain terminal may be coupled to the ground voltage terminal.

The transistor (T_csen) may configured such that the source terminal is coupled to the drain terminal of the first driving transistor (T_cc), and the drain terminal is coupled to the sensing part 200. The transistor (T_csen) may be turned on according to the control signal CCG_Sen(n) while the sensing driving is being performed, and may transfer the first current flowing in the first driving transistor (T_cc) to the sensing part 200 through the sensing line (SSL).

The transistor (T_psen) may be configured such that the source terminal is coupled to the drain terminal of the second driving transistor (T_pwm), and the drain terminal is coupled to the sensing part 200. The transistor (T_psen) may be turned on according to a control signal PWM_Sen(n) while the sensing driving is being performed, and may transfer the second current flowing in the second driving transistor (T_pwm) to the sensing part 200 through the sensing line (SSL).

The transistor (T_ini) may be turned on according to the control signal Vinitial while the image data voltage (constant current generator data voltage, PWM data voltage) or the specific voltage (first specific voltage, second specific voltage) is being applied to the sub pixel circuit 110, and may transfer the driving voltage (VDD_CCG) to the source terminal of the driving transistor (T_cc). In addition, the transistor (T_ini) may be turned off according to the control signal Vinitial for the driving current to flow in the inorganic light emitting device 20 in the light emitting interval (③) which will be described below.

The anode terminal of the inorganic light emitting device 20 may be coupled with the driving voltage terminal to which the driving voltage (VDD_CCG) is applied. The driving voltage terminal may be the common electrode. Accordingly, according to an embodiment of the disclosure, the display panel 100 may have an anode common structure by which the anode terminal of all inorganic light emitting devices 20 is coupled to the common anode electrode.

Because the unit configurations of the sensing part 200 shown in FIG. 7A are the same as that shown in FIG. 6A, redundant descriptions thereof will be omitted.

Figure 7B:
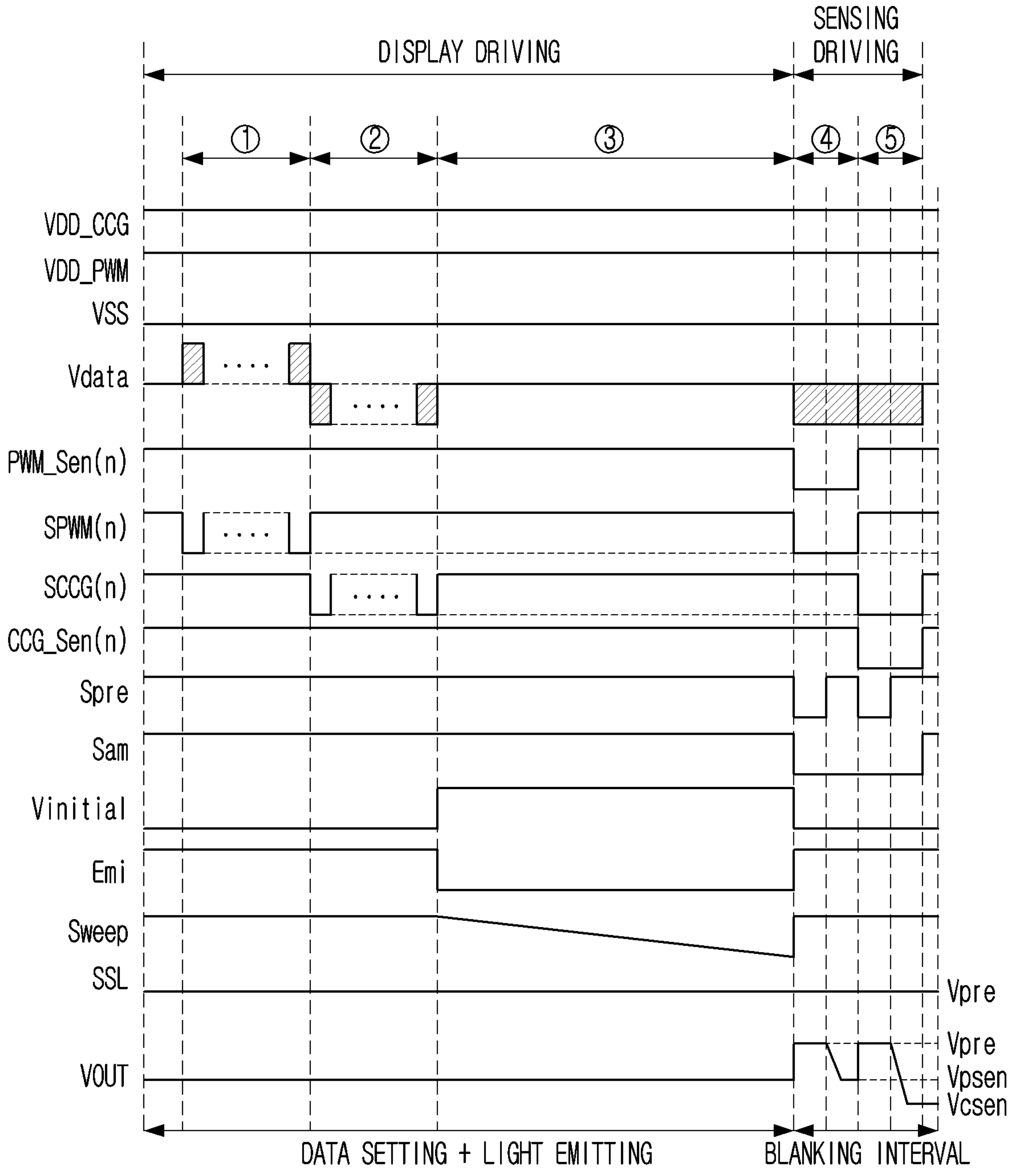
FIG. 7B is a driving time diagram illustrating timing behavior of a display apparatus according to another embodiment of the disclosure.

FIG. 7B is a driving time diagram illustrating timing behavior of the display apparatus 1000 according to an embodiment of the disclosure. Specifically, FIG. 7B shows the various control signals, driving voltage signals, and data signals that are applied to the sub pixel circuits 110 included in the display panel 100 for one image frame period.

Referring to FIG. 7B, the display panel 100 may be driven in the display driving and the sensing driving order for the one image frame period.

The display driving interval may include a PWM data setting interval (①), a constant current generator data setting interval (②) and a light emitting interval(③).

During the display driving interval, the corresponding image data voltage may be set in each sub pixel circuit 110 of the display panel 100.

Specifically, during the PWM data voltage setting interval (①), the PWM data voltage that is applied from the data driver 510 may be set in the PWM circuit 112 (specifically, the gate terminal of the second driving transistor (T_pwm)) of the sub pixel circuit 110.

The PWM data voltage may be applied to the sub pixel circuits of the display panel 100 in a row line order, and set in the PWM circuit 112 of each of the sub pixels in the row line order. That is, the n in the parenthesis from the control signal SPWM(n) in FIG. 7B may mean an nth row line.

During the constant current generator data voltage setting interval (②), the constant current generator data voltage that is applied from the data driver 510 may be set in the constant current generator circuit 111 (specifically, the gate terminal of the first driving transistor (T_cc)) of the sub pixel circuit 110.

The constant current generator data voltage may also be applied to the sub pixel circuits of the display panel 100 in the row line order, and set in the constant current generator circuit 111 of each of the sub pixels in the row line order. That is, then in the parenthesis from the control signal SCCG(n) in FIG. 7B may mean the nth row line.

The light emitting interval (③) may be an interval at which the inorganic light emitting devices 20 of each sub pixel proceed to collectively emit light based on the PWM data voltage setting interval (①) and the PWM data voltage and the constant current generator data voltage set in the constant current generator data voltage setting interval (①).

The sensing driving interval may include a sensing interval (④) of the PWM circuit 112 and a sensing interval (⑤) of the constant current generator circuit 111.

During the sensing interval (④) of the PWM circuit 112, the second current that flows in the second driving transistor (T_pwm) may be transferred to the sensing part 200 based on the second specific voltage that is applied from the data driver 510.

During the sensing interval (⑤) of the constant current generator circuit 111, the first current that flows in the first driving transistor (T_cc) may be transferred to the sensing part 200 based on the first specific voltage that is applied from the data driver 510.

Accordingly, the sensing part 200 may output the first sensing data and the second sensing data, respectively, based on the first and second current.

According to an embodiment of the disclosure, the sensing driving operation may be performed in the blanking interval (specifically, vertical blanking interval) from among the one image frame period as shown in FIG. 7B. The vertical blanking period may refer to a time interval at which effective image data is not input in the display panel 100.

Accordingly, the sensing part 200 may sense the current flowing in the driving transistors (T_cc, T_pwm) based on the specific voltage that is applied during the blanking interval of the one image frame, and output sensing data corresponding to the sensed current.

However, the disclosure is not limited thereto. For example, the sensing driving may be performed during the booting period, the power off period, the screen off period, or the like of the display apparatus 1000. Here, the booting period may mean the period after the system power is applied and before the screen is turned on, the power off period may mean the period after the screen is turned off and before the system power is de-powered, and the screen off period may mean the period at which the system power is being applied but the screen is turned off.

Referring to FIG. 7A and FIG. 7B, separate driving voltages (i.e., first driving voltage (VDD_CCG) and second driving voltage (VDD_PWM)) different from each other are shown being applied to the constant current generator circuit 111 and the PWM circuit 112.

If one driving voltage (e.g., VDD) is commonly used in the constant current generator circuit 111 and the PWM circuit 112, it may be problematic for the constant current generator circuit 111 that uses driving voltage for applying driving current to the inorganic light emitting device 20, and the PWM circuit 112 that controls only the pulse width of the driving current through controlling the turning-on or turning-off of the second driving transistor (T_pwm) to use same driving voltage (VDD).

Specifically, an actual display panel 100 may have a difference in resistance value for each area. Accordingly, a difference in IR drop value may occur for each area when driving current flows, and thereby, a difference in driving voltage (VDD) may occur according to a position of the display panel 100.

Accordingly, if the PWM circuit 112 and the constant current generator circuit 111 both use the driving voltage (VDD) in the circuit structure shown in FIG. 7A, a problem of an operation time point of the PWM circuit 112 being different for each area with respect to the same PWM data voltage may occur. This is because the turning-on or turning-off operation of the second driving transistor (T_pwm) may be affected by the change in driving voltage due to the driving voltage being applied to the source terminal of the second driving transistor (T_pwm).

The problem described above may be solved by applying separate driving voltages to the constant current generator circuit 111 and the PWM circuit 112, respectively, as shown in FIG. 7A.

That is, as described above on when the driving current is flowing, even if the driving voltage (VDD_CCG) of the constant current generator circuit 111 is changed for each area of the display panel 100, because a separate driving voltage (VDD_PWM) that has no difference for each area is applied due to the driving current not flowing in the PWM circuit 112, the above-described problem may be solved.

An operation of the display apparatus 1000 in each driving interval (④ to ⑤) described above in FIG. 7B will be described in greater detail below with reference to FIG. 8A to FIG. 8E.

Figure 8A:
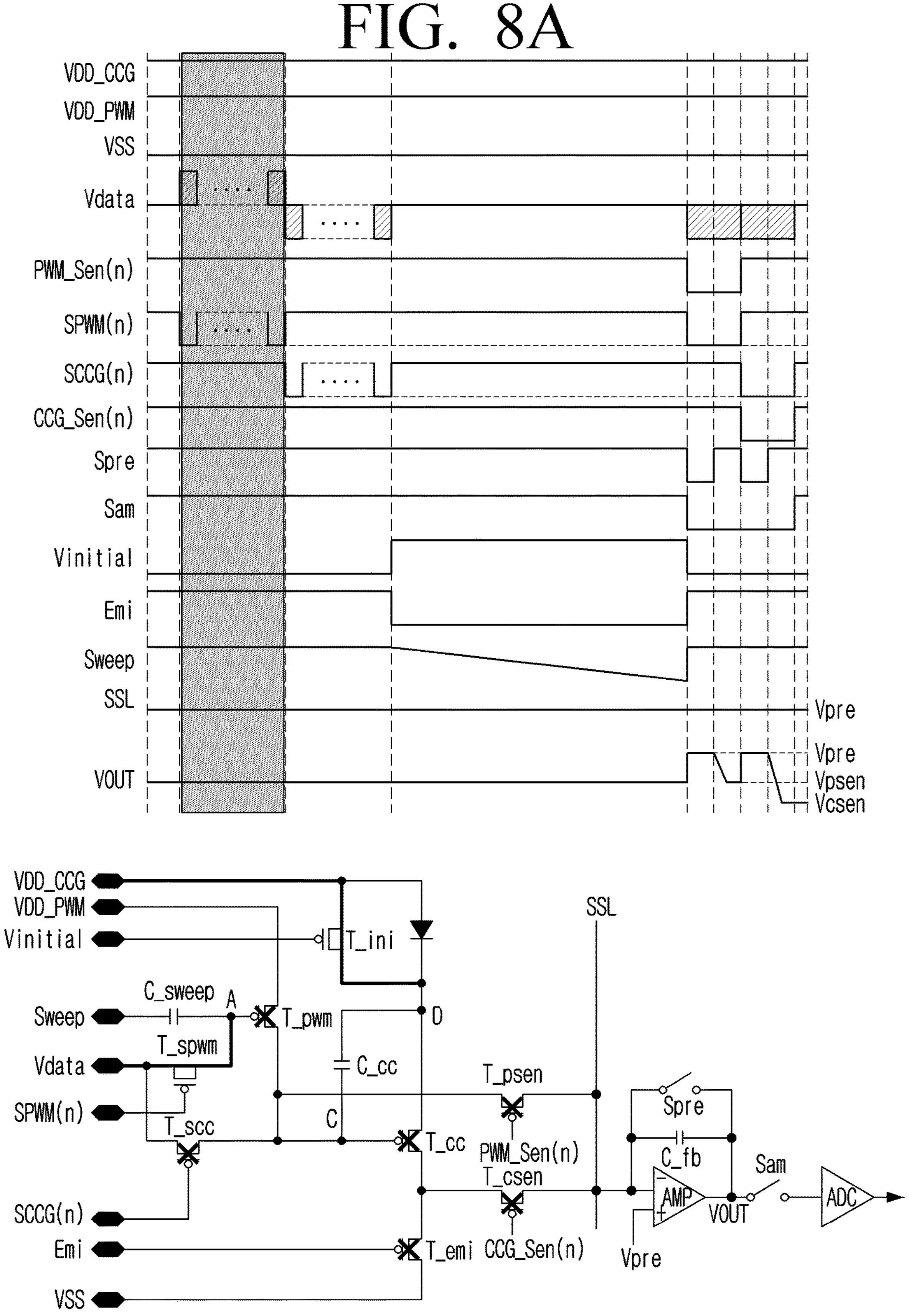
FIG. 8A is a diagram illustrating an operation of a sub pixel circuit during a pulse-width modulation (PWM) data setting interval according to the embodiment of FIG. 7B.

FIG. 8A is a diagram illustrating an operation of the sub pixel circuit 110 during the PWM data setting interval (①), according to the embodiment of FIG. 7B.

During the PWM data setting interval (①), the PWM data voltage from the data driver 510 may be applied to the data signal line (Vdata).

The transistor (T_spwm) may be turned on according to the control signal SPWM(n), and the PWM data voltage may be input (or set) in the gate terminal (hereinafter, referred to as a 'A node') of the second driving transistor (T_pwm) through the turned-on transistor (T_spwm).

The PWM data voltage may be a voltage within a voltage range of greater than or equal to a sum of the second driving voltage (VDD_PWM) and a threshold voltage (Vth_pwm) of the second driving transistor (T_pwm). Accordingly, the second driving transistor (T_pwm) may maintain a turned-off state while the PWM data voltage is set in the A node as shown in FIG. 8A, except for when the PWM data voltage is a voltage corresponding to a full black grayscale.

The PWM data voltage setting operation as described above may be carried out in each row line order repeated 270 times when, for example, the display panel 100 is formed of 270 row lines.

Figure 8B:
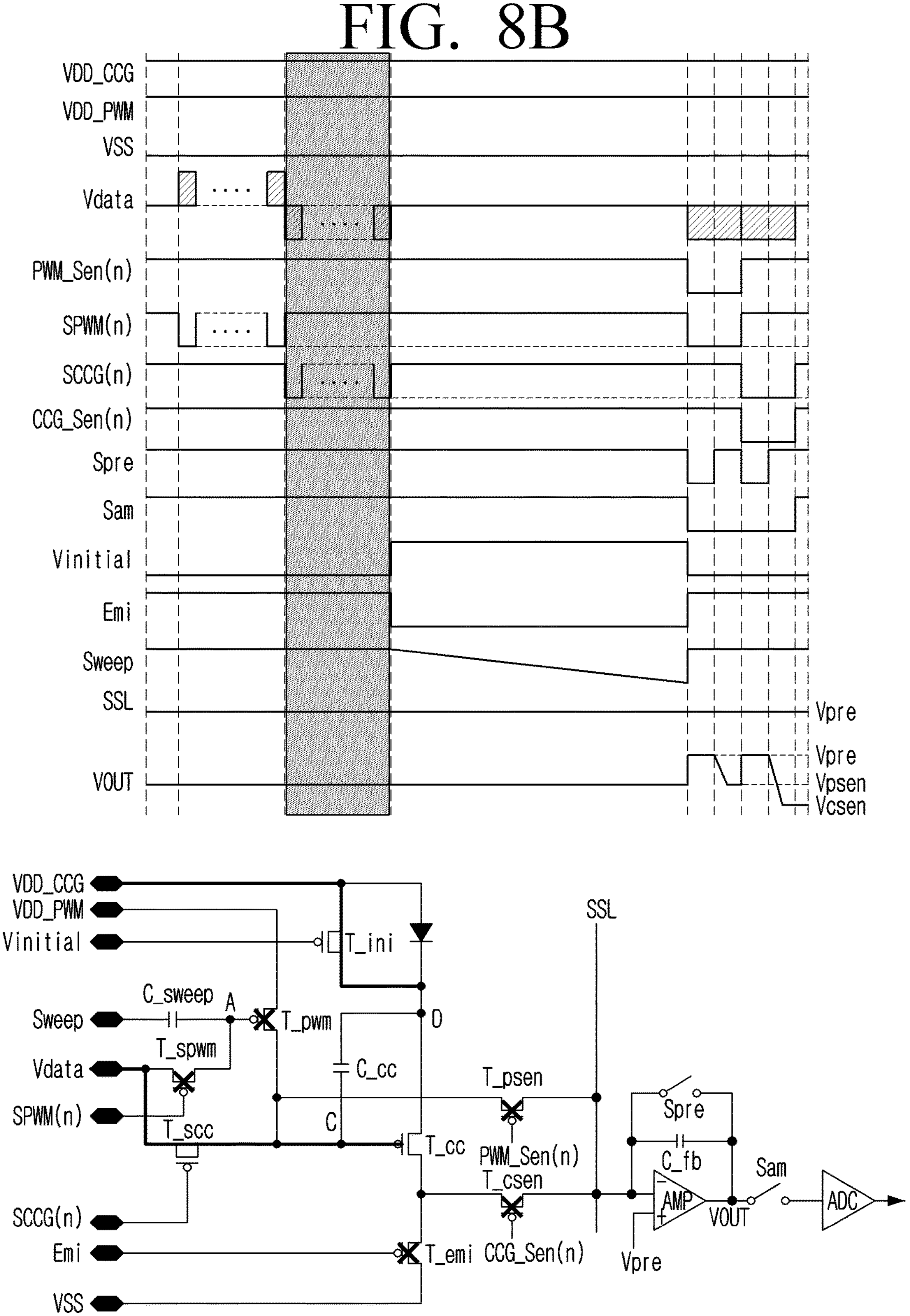
FIG. 8B is a diagram illustrating an operation of a sub pixel circuit during a data setting interval of a constant current generator according to the embodiment of FIG. 7B.

FIG. 8B is a diagram illustrating an operation of the sub pixel circuit 110 during the data setting interval (②) of the constant current generator, according to the embodiment of FIG. 7B.

During the constant current generator data setting interval(②), the constant current generator data voltage from the data driver 510 may be applied to the data signal line (Vdata).

The transistor (T_scc) may be turned on according to the control signal SCCG(n), and the constant current generator data voltage may be input (or set) in the gate terminal (hereinafter, referred to as a 'C node') of the first driving transistor (T_cc) through the turned-on transistor (T_scc).

During the constant current generator data setting interval, the transistor (T_ini) may be in the turned-on state according to the control signal Vinitial. Accordingly, the first driving voltage (VDD_CCG) may be input to the source terminal (D node) of the driving transistor (T_cc) through the turned-on transistor (T_ini).

Finally, during the constant current generator data setting interval, a voltage corresponding to a difference in the first driving voltage (VDD_CCG) and the constant current generator data voltage may be set between the source terminal and the gate terminal (that is, at both ends of the capacitor (C_cc)) of the driving transistor (T_cc).

The constant current generator data voltage may be a voltage within a voltage range of less than a sum of the first driving voltage (VDD_CCG) and a threshold voltage (Vth_cc) of the first driving transistor (T_cc). Accordingly, the first driving transistor (T_cc) may maintain the turned-on state while the constant current generator data voltage is set in the C node.

The setting operation for the constant current generator data voltage described above may also be carried out, based on the display panel 100 being formed of, for example, 270 row lines, in the respective row line order repeated 270 times.

Figure 8C:
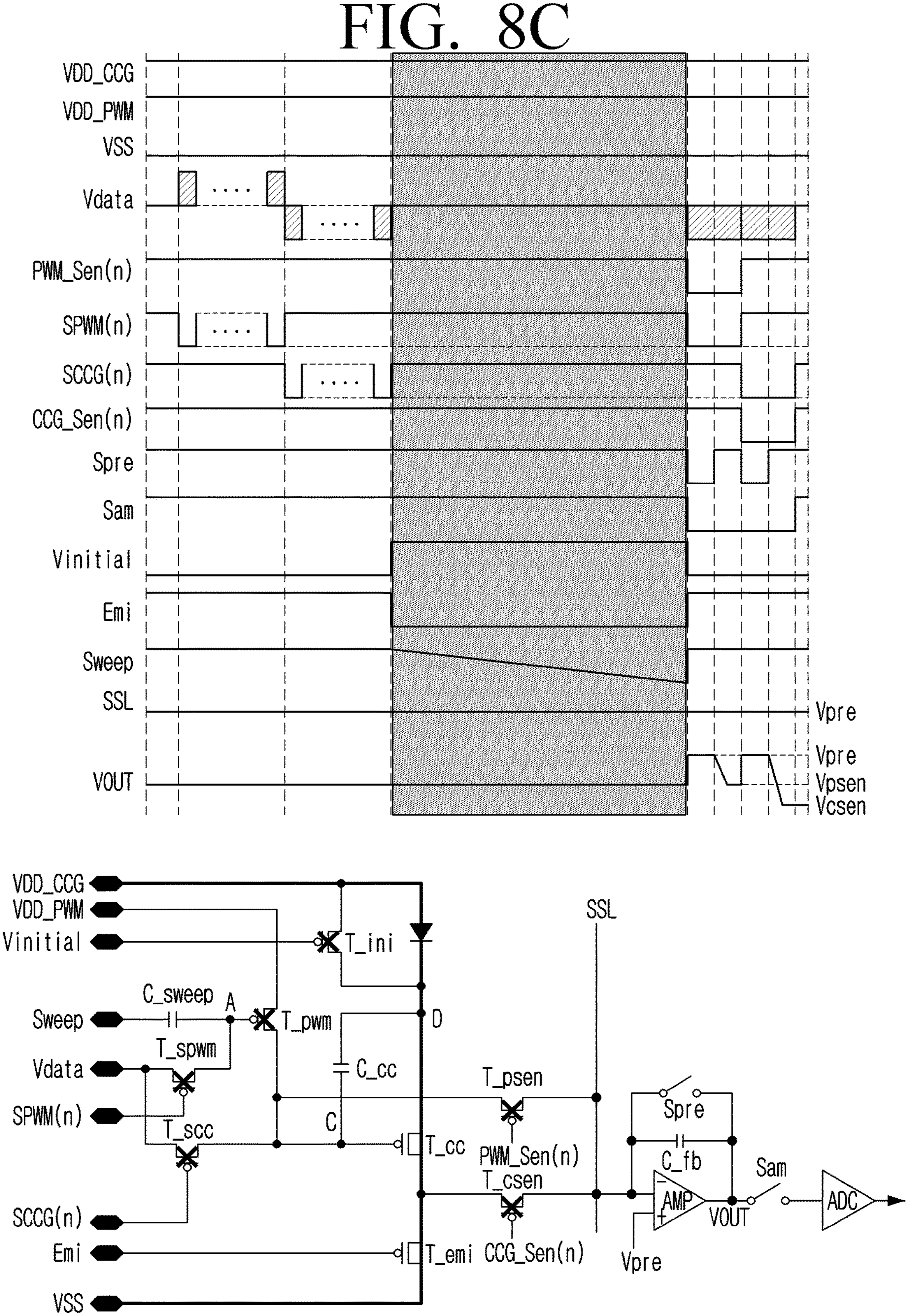
FIG. 8C is a diagram illustrating an operation of a sub pixel circuit during a light emitting interval according to the embodiment of FIG. 7B.

FIG. 8C is a diagram illustrating an operation of the sub pixel circuit 110 during the light emitting interval (③), according to the embodiment of FIG. 7B.

When the light emitting interval is started, the transistor (T_emi) may be turned on according to the control signal Emi, and may maintain the turned-on state during the light emitting interval. In addition, as described above in FIG. 8B, the first driving transistor (T_cc) may be in the turned-on state while the constant current generator data voltage is set in the C node.

Accordingly, when the light emitting interval is started, the driving current may flow through the inorganic light emitting device 20, the driving transistor (T_cc), and the transistor (T_emi), and the inorganic light emitting device 20 may begin emitting light.

A forward voltage drop may also occur at this time at both ends of the inorganic light emitting device 20, but as described above in FIG. 6B, the voltage (i.e., the voltage at both ends of the capacitor (C_cc)) between the gate terminal and the source terminal of the driving transistor (T_cc) may be maintained the same in the constant current generator data setting interval and the light emitting interval.

When the light emitting interval is started, a sweep voltage (Sweep) which is voltage that linear decreases may be coupled to the A node through the capacitor (C_sweep). Accordingly, the voltage of A node may decrease according to changes in sweep voltage.

When a voltage value of the decreasing A node becomes same as a sum of the second driving voltage (VDD_PWM) and the threshold voltage (Vth_pwm) of the second driving transistor (T_pwm), the second driving transistor (T_pwm) that maintained the turned-off state may be turned on, and the second driving voltage (VDD_PWM) may be applied to the C node through the turned-on second driving transistor (T_pwm).

Accordingly, the first driving transistor (T_cc) may be turned off, the driving current may stop flowing, and the inorganic light emitting device 20 may also stop emitting light. This is because, as the second driving voltage (VDD_PWM) is applied to the C node, the voltage between the gate terminal and the source terminal of the first driving transistor (T_cc) may become greater than the threshold voltage (Vth_cc) of the first driving transistor (T_cc) (e.g., even if a voltage of a same magnitude is used for the first driving voltage (VDD_CCG) and the second driving voltage (VDD_PWM), because the threshold voltage (Vth_cc) of the first driving transistor (T_cc) has a negative value, the first driving transistor (T_cc) may be turned off when the second driving voltage (VDD_PWM) is applied to the C node).

That is, in various embodiments, the driving current may flow from when the light emitting interval is started to when a voltage value of the A node changes according to the sweep voltage and the second driving transistor (T_pwm) is turned on.

Accordingly, according to various embodiments, the driving time of the driving current—that is, a light emitting time of the inorganic light emitting device 20—may be controlled by adjusting a PWM data voltage value that is set in the A node.

When the PWM data voltage has a voltage value corresponding to a full black grayscale, the second driving transistor (T_pwm) may be in the turned-on state while the PWM data voltage is in a set state in the A node. Accordingly, the second driving voltage (VDD_PWM) may be applied to the C node from the start, and the first driving transistor (T_cc) need not also be turned on from the start. Accordingly, even if the light emitting interval is started, the driving current need not flow in the inorganic light emitting device 20.

Figure 8D:
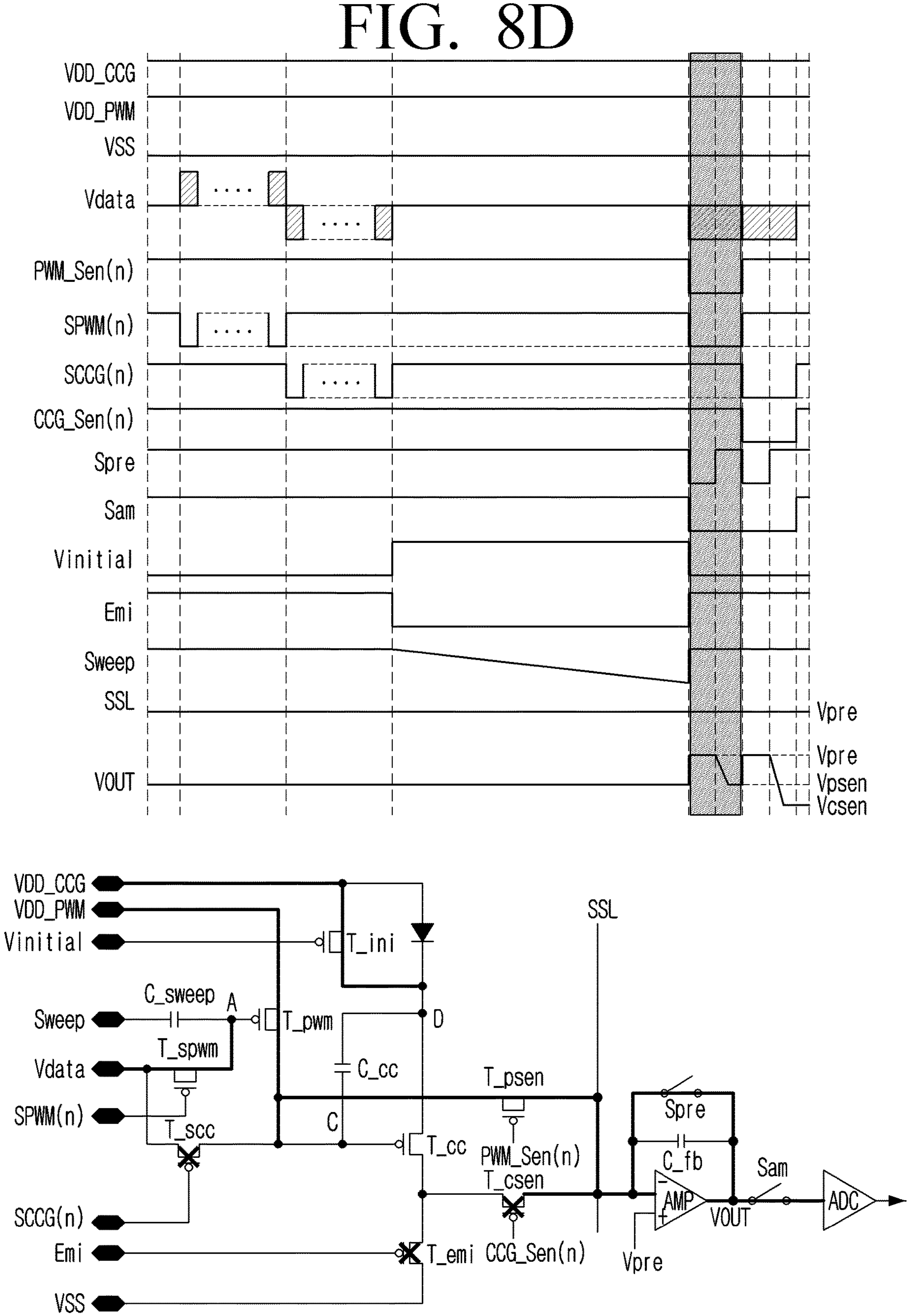
FIG. 8D is a diagram illustrating an operation of a sub pixel circuit and a driving part at a sensing interval of a PWM circuit according to the embodiment of FIG. 7B.

FIG. 8D is a diagram illustrating an operation of the sub pixel circuit 110 and the driving part 500 during the sensing interval (®) of a PWM circuit 112, according to the embodiment of FIG. 7B.

During the sensing interval of the PWM circuit 112, the second specific voltage from the data driver 510 may be applied to the data signal line (Vdata). The transistor (T_spwm) may be turned on according to the control signal SPWM(n), and the second specific voltage may be applied to the A node through the turned-on transistor (T_spwm). Here, the second specific voltage may be any preset voltage for turning on the second driving transistor (T_pwm).

During the sensing interval of the PWM circuit 112, the transistor (T_psen) may be turned on according to the control signal PWM_Sen(n), and the second current that flows in the second driving transistor (T_pwm) may be transferred to the sensing part 200 through the turned-on transistor (T_psen).

During the sensing interval of the PWM circuit 112, the first switch 213 of the sensing part 200 may be turned on and turned off according to the control signal Spre. The period at which the first switch 213 is turned on within the sensing interval of the PWM circuit 112 will be referred to as a first initialization period, and the turned-off period will be referred to as a first sensing period and described below.

Because the first switch 213 is in the turned-on state in the first initialization period, the reference voltage (Vpre) which is input to the non-inverting input terminal (+) of the amplifier 211 may be maintained in the output terminal (Vout) of the amplifier 211.

Because the first switch 213 is turned off in the first sensing period, the amplifier 211 may integrate the second current by operating as the current integrator. A voltage difference at both ends of the integration capacitor 212 may increase as the sensing time progresses, that is, as the charge amount that is accumulated increases by the second current that is introduced to the inverting input terminal (−) of the amplifier 211 during the first sensing period.

However, due to the properties of the virtual ground of the amplifier 211, because the voltage of the inverting input terminal (−) in the first sensing period is maintained at the reference voltage (Vpre) regardless of an increase in voltage difference of the integration capacitor 212, the voltage of the output terminal (Vout) of the amplifier 211 may be lowered to correspond to the voltage difference at both ends of the integration capacitor 212.

Based on the principle above, the second current that is introduced to the sensing part 200 during the first sensing period may be accumulated as an integrated value Vpsen, which is a voltage value, through the integration capacitor 212. Because the falling slope of the voltage of the output terminal (Vout) of the amplifier 211 increases as the second current is greater, a magnitude of the integrated value Vpsen may become smaller as the second current is greater.

The integrated value Vpsen may be input to the ADC 220 while the second switch 214 is maintained in the turned-on state in the first sensing period, and output to the correcting part 300 after being converted to second sensing data from the ADC 220.

Figure 8E:
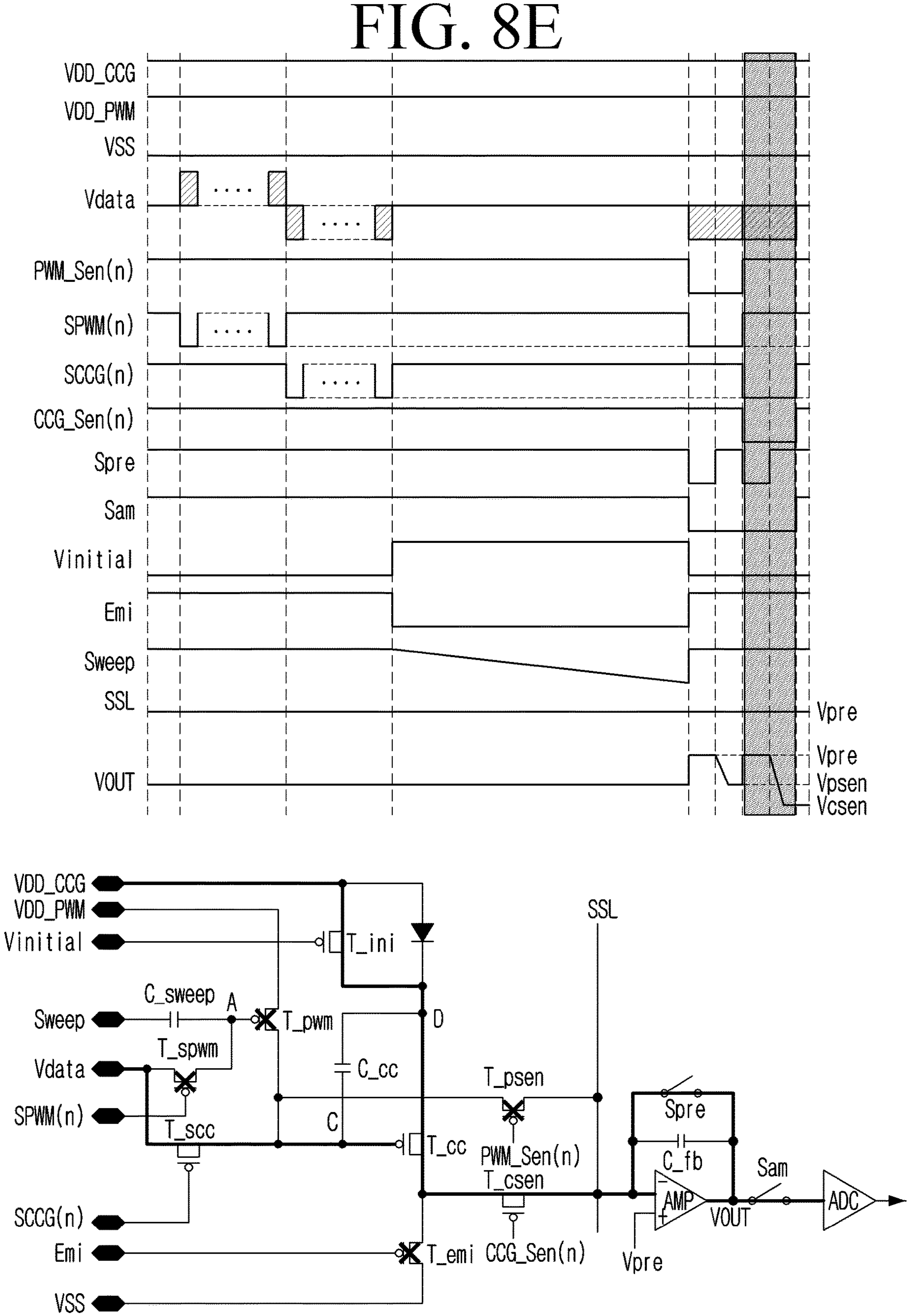
FIG. 8E is a diagram illustrating an operation of a sub pixel circuit and a driving part at a sensing interval of a constant current generator circuit according to the embodiment of FIG. 7B.

FIG. 8E is a diagram illustrating an operation of the sub pixel circuit 110 and the driving part 500 during the sensing interval (⑤) of the constant current generator circuit 111, according to the embodiment of FIG. 7B.

During the sensing interval of the constant current generator circuit 111, the first specific voltage from the data driver 510 may be applied to the data signal line (Vdata). The transistor (T_scc) may be turned on according to the control signal SCCG(n), and the first specific voltage may be input to the C node through the turned-on transistor (T_scc). Here, the first specific voltage may be any preset voltage for turning on the first driving transistor (T_cc).

During the sensing interval of the constant current generator circuit 111, the transistor (T_csen) may be turned on according to the control signal CCG_Sen(n), and the first current that flows in the first driving transistor (T_cc) may be transferred to the sensing part 200 through the turned-on transistor (T_csen).

During the sensing interval of the constant current generator circuit 111, the first switch 213 of the sensing part 200 may be turned on and turned off according to the control signal Spre. The period at which the first switch 213 is turned-on within the sensing interval of the constant current generator circuit 111 will be referred to as a second initialization period, and the turned-off period will be referred to as a second sensing period and described below.

Because the first switch 213 is in the turned-on state in the second initialization period, the reference voltage (Vpre) which is input to the non-inverting input terminal (+) of the amplifier 211 may be maintained in the output terminal (Vout) of the amplifier 211.

Because the first switch 213 is turned off in the second sensing period, the amplifier 211 may integrate the first current by operating as the current integrator. A voltage difference at both ends of the integration capacitor 212 may increase as the sensing time progresses; for example, as the charge amount that is accumulated increases by the first current that is introduced to the inverting input terminal (−) of the amplifier 211 during the second sensing period.

However, due to the properties of the virtual ground of the amplifier 211, because the voltage of the inverting input terminal (−) in the second sensing period is maintained at the reference voltage (Vpre) regardless of an increase in voltage difference of the integration capacitor 212, the voltage of the output terminal (Vout) of the amplifier 211 may be lowered to correspond to the voltage difference at both ends of the integration capacitor 212.

Based on the principle above, the first current that is introduced to the sensing part 200 during the second sensing period may be accumulated as an integrated value Vpsen, which is a voltage value, through the integration capacitor 212. Because the falling slope of the voltage of the output terminal (Vout) of the amplifier 211 increases as the first current is greater, a magnitude of the integrated value Vcsen may become smaller as the first current is greater.

The integrated value Vcsen may be input to the ADC 220 while the second switch 214 is maintained in the turned-on state in the second sensing period, and output to the correcting part 300 after being converted to first sensing data from the ADC 220.

Accordingly, as described above, the correcting part 300 may obtain the first compensation value and the second compensation value based on the first sensing data and the second sensing data, respectively, and store or update the obtained first compensation value and second compensation value in the memory (not shown).

Then, when the display driving is performed, the correcting part 300 may correct the constant current generator data voltage and the PWM data voltage which are to be applied to the sub pixel circuit 110 based on the first compensation value and the second compensation value, respectively. Accordingly, the variation in electrical properties between the first driving transistors (T_cc) and the variance in electrical properties between the second driving transistors (T_pwm) may be compensated.

According to an embodiment of the disclosure, the first specific voltage and the second specific voltage may be applied to the sub pixel circuits that correspond to one row line per one image frame. That is, according to an embodiment of the disclosure, the above-described sensing driving may be performed with respect to one row line per one image frame. The above-described sensing driving may proceed in the row line order.

Accordingly, if the display panel 100 is formed of, for example, 270 row lines, the above-described sensing driving may be performed for the sub pixel circuits included in the 1st row line with respect to the 1st image frame, and the above-described sensing driving may be performed for the sub pixel circuits included in the 2nd row line with respect to the 2nd image frame.

In the method described above, based on the sensing driving being performed for the pixel circuits included in the 270th row line with respect to the 270th image frame, the sensing driving for all the sub pixel circuits included in the display panel 100 may be completed one time.

According to another embodiment of the disclosure, the first specific voltage and the second specific voltage may be applied to the sub pixel circuits that correspond to the plurality of row lines per one image frame. That is, according to an embodiment of the disclosure, the above-described sensing driving may be performed for the plurality of row lines per one image frame. The above-described sensing driving may proceed in the row line order.

Accordingly, assuming that the display panel 100 includes, for example, 270 row lines, and that the above-described sensing driving is performed for three row lines per one image frame, the above-described sensing driving may be performed for the sub pixel circuits included in 1st to 3rd row lines with respect to the 1st image frame, and the above-described sensing driving may be performed for the sub pixel circuits included in 4th to 6th row lines with respect to the 2nd image frame.

In the method described above, based on the above-described sensing driving being performed for the sub pixel circuits included in the 268th to 270th row lines with respect to the 90th image frame, the sensing driving for all the sub pixel circuits included in the display panel 100 may be completed one time. Accordingly, in this case, when the driving for the 270th image frame is completed, the above-described sensing driving for all the sub pixel circuits included in the display panel 100 may be completed three times.

In the above, an example of the driving interval associated with the setting of the image data voltage in the order of the PWM data setting interval (①) and the constant current generator data setting interval (②) being carried out has been provided, but the disclosure is not limited thereto, and the constant current generator data setting interval (②) may be carried out first according to an embodiment, and the PWM data setting interval (①) may be carried out thereafter.

In addition, in the above, although an example of the sensing driving being carried out in the order of the sensing interval (④) of the PWM circuit 112 and the sensing interval ⑤) of the constant current generator circuit 111 has been provided, the disclosure is not limited thereto, and it may be possible for the sensing interval ⑤) of the constant current generator circuit 111 to be carried out first according to an embodiment, and the sensing interval (④) of the PWM circuit 112 to be carried out thereafter.

In addition, in the above, the sensing driving being carried out after the display driving has been provided as an example, but is not limited thereto, and it may be possible for the sensing driving to be carried out first according to an embodiment, and the display driving to be carried thereafter.

Figure 9A:
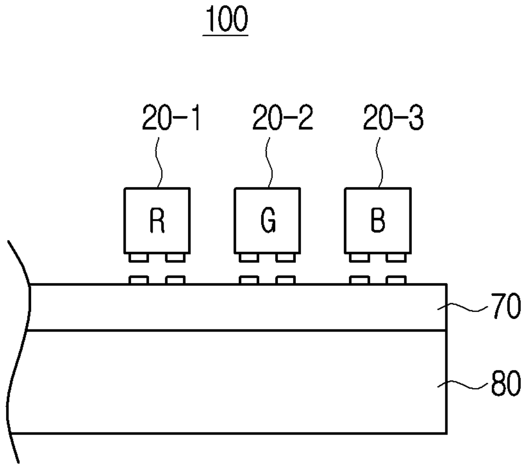
FIG. 9A is a cross-section diagram illustrating a display panel according to an embodiment of the disclosure.

FIG. 9A is a cross-section diagram illustrating the display panel 100 according to an embodiment of the disclosure. In FIG. 9A, only one pixel included in the display panel 100 has been shown for convenience in description.

According to FIG. 9A, the display panel 100 may include a glass substrate 80, a TFT layer 70, and R, G, and B inorganic light emitting devices 20-1, 20-2, and 20-3. The above-described sub pixel circuit 110 may be implemented as a thin film transistor (TFT), and may be included in the TFT layer 70 on the glass substrate 80.

The respective R, G, and B inorganic light emitting devices 20-1, 20-2, and 20-3 may be mounted on the TFT layer 70 to be electrically coupled with the corresponding sub pixel circuit 110 and form the above-described sub pixel.

Although not shown in the drawings, in the TFT layer 70, the sub pixel circuit 110 that provides driving current to the inorganic light emitting devices 20-1, 20-2, and 20-3 may be present for each of the inorganic light emitting devices 20-1, 20-2, and 20-3, and the each of the inorganic light emitting devices 20-1, 20-2, and 20-3 may be respectively mounted or disposed over the TFT layer 70 to be electrically coupled with the corresponding sub pixel circuit 110.

In FIG. 9A, an example of the R, G, and B inorganic light emitting devices 20-1, 20-2, and 20-3 being micro LEDs of a flip chip type has been provided and shown. However, the disclosure is not limited thereto, and the R, G, and B inorganic light emitting devices 20-1, 20-2, and 20-3 may be micro LEDs of a lateral type or a vertical type according to an embodiment.

Figure 9B:
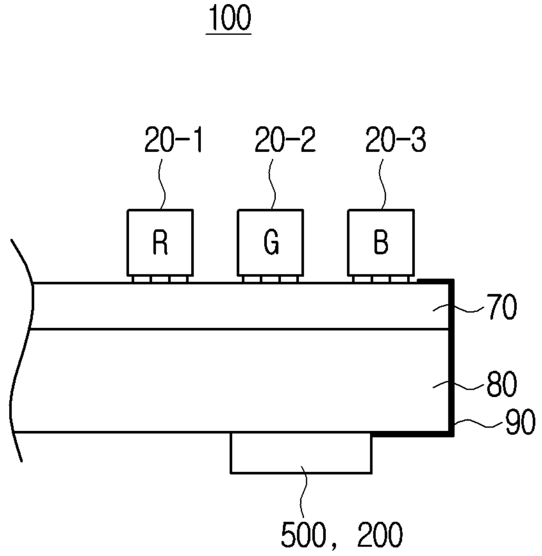
FIG. 9B is a cross-sectional diagram illustrating a display panel according to another embodiment of the disclosure.

FIG. 9B is a cross-sectional diagram illustrating the display panel 100 according to another embodiment of the disclosure.

According to FIG. 9B, the display panel 100 may include the TFT layer 70 formed at one surface of the glass substrate 80, the R, G, and B inorganic light emitting devices 20-1, 20-2, and 20-3 mounted over the TFT layer 70, the driving part 500, and the sensing parts 200, and include coupling wirings 90 for electrically coupling the sub pixel circuit 110, the driving part 500 formed at the TFT layer 70, and the sensing parts 200.

As described above, according to an embodiment of the disclosure, at least a portion from among the various configurations that may be included in the driving part 500 may be implemented as a separate chip form and disposed at a back surface of the glass substrate 80, and coupled with the sub pixel circuits 110 formed at the TFT layer 70 through the coupling wirings 90.

In this respect, referring to FIG. 9B, the sub pixel circuits 110 included in the TFT layer 70 is shown as electrically coupled with the driving part 500 through the coupling wirings 90 formed at an edge (or side surface) of a TFT panel (hereinafter, the TFT layer 70 and the glass substrate 80 may be collectively referred to as the TFT panel).

As described above, a reason for forming the coupling wirings 90 at the edge area of the display panel 100 and connecting the sub pixel circuits 110 included in the TFT layer 70 with the driving part 500 is because, when holes passing the glass substrate 80 are formed to connect the sub pixel circuits 110 with the driving part 500, problems such as cracks occurring at the glass substrate 80 may occur due to a temperature difference in-between a process of manufacturing TFT panels 70 and 80 and a process of filling a conductive material in the holes.

In the above, an example of the sub pixel circuit 110 being implemented at the TFT layer 70 has been described. However, the disclosure is not limited thereto. That is, according to another embodiment of the disclosure, when implementing the sub pixel circuit 110, it may be possible to implement a pixel circuit chip in an ultra-small micro chip form in a sub pixel unit or a pixel unit without using the TFT layer 70, and mount the same over the substrate 80. A position at which a sub pixel chip is mounted may be, for example, at a periphery of the corresponding inorganic light emitting device 20, but is not limited thereto.

In addition, in various embodiments described above, the TFT that forms the TFT layer (or the TFT panel) may be a low temperature poly silicon (LTPS) TFT, but is not necessarily limited thereto. That is, the type of TFT may be any TFT as long as it can form the circuit shown in FIG. 5A or FIG. 7A. For example, the TFT may be implemented with an oxide TFT, a silicon (poly silicon or a-silicon) TFT, an organic TFT, a graphene TFT, and the like, and may be applied producing only a P type MOSFET from a Si wafer CMOS process.

In the above, the display panel 100 according to various embodiments may be applied to a wearable device, a portable device, a handheld device and various other electronic products or electronic devices that implement a display as a single unit.

In addition, the display panel 100 according to various embodiments may be applied, through an assembly placement of a plurality of display panels 100, to a small scale display apparatus such as a monitor for a personal computer (PC), and a TV, and to a large scale display apparatus such as a digital signage and an electronic display.

According to various embodiments as described above, unevenness which can appear in images due to variations in electrical characteristics of the driving transistor and the inorganic light emitting devices may be easily compensated. In addition, color correcting may become more easily facilitated.

In addition, it may be possible to compensate for unevenness and correct color more easily when forming a large area display panel by combining display panels in module form, or even when forming one large-scale display apparatus.

In addition, a wavelength of light that is emitted by inorganic light emitting devices may be prevented from changing according to a grayscale.

In addition, it may be possible to design driving circuits that are more optimized, and drive the inorganic light emitting devices stably and efficiently.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. A display apparatus, comprising:

a display panel comprising a pixel array of pixels, each pixel of the pixel array being disposed on one of a plurality of row lines, each pixel of the pixel array comprising a plurality of inorganic light emitting devices, and a sub pixel circuit corresponding to each of the plurality of inorganic light emitting devices, each sub pixel circuit comprising a driving transistor, each sub pixel circuit being configured to drive a corresponding inorganic light emitting device based on an image data voltage that is applied;

a sensing part configured to sense current that flows in the driving transistor of at least one sub pixel circuit based on a specific voltage that is applied to the at least one sub pixel circuit, and to output sensing data corresponding to the sensed current; and a correcting part configured to correct image data voltage that is applied to the sub pixel circuit based on the sensing data, wherein the driving transistor is a p-type metal-oxide-semiconductor field-effect transistor (PMOSFET), and wherein each inorganic light emitting device is configured such that an anode electrode thereof is coupled to a common electrode to which driving voltage is applied, and a cathode electrode thereof is coupled to a source terminal of the driving transistor, wherein the image data voltage comprises a constant current generator data voltage and a pulse width modulation (PWM) data voltage, wherein the pixel circuit comprises a first driving transistor and a second driving transistor, wherein the specific voltage comprises a first specific voltage that is applied to a gate terminal of the first driving transistor and a second specific voltage that is applied to a gate terminal of the second driving transistor, and wherein the sensing part is configured to:

sense first current that flows in the first driving transistor based on the first specific voltage;

output first sensing data corresponding to the sensed first current;

sense second current that flows in the second driving transistor based on the second specific voltage; and output second sensing data corresponding to the sensed second current, and wherein the correcting part is configured to correct the constant current generator data voltage based on the first sensing data, and correct the PWM data voltage based on the second sensing data.

2. The display apparatus of claim 1, wherein:

the sub pixel circuit a constant current generator circuit configured to control a magnitude of driving current that is provided to the inorganic light emitting device based on the constant current generator data voltage that is applied to the gate terminal of the first driving transistor.

3. The display apparatus of claim 2, wherein:

the specific voltage comprises a first specific voltage that is applied to the gate terminal of the first driving transistor, the sensing part is configured to sense first current that flows in the first driving transistor based on the first specific voltage, and to output first sensing data corresponding to the sensed first current, and the correcting part is configured to correct the constant current generator data voltage based on the first sensing data.

4. The display apparatus of claim 3, wherein:

the sub pixel circuit comprises a first transistor by which a source terminal is coupled to a drain terminal of the first driving transistor, the drain terminal being coupled to the sensing part, and the first current is provided to the sensing part through the first transistor while the first specific voltage is being applied to the gate terminal of the first driving transistor.

5. The display apparatus of claim 2, wherein:

the constant current generator circuit comprises a second transistor which is parallel coupled with the inorganic light emitting device, the constant current generator data voltage is applied to the gate terminal of the first driving transistor while the second transistor is in a turned-on state, and driving current is configured to flow in the inorganic light emitting device while the second transistor is in a turned-off state.

6. The display apparatus of claim 2, wherein:

the constant current generator circuit comprises a first capacitor which is coupled between a source terminal and the gate terminal of the first driving transistor, and a voltage at both ends of the first capacitor is maintained regardless of a forward voltage drop in the inorganic light emitting device.

7. The display apparatus of claim 2, wherein:

the sub pixel circuit comprises a PWM circuit configured to control a driving time of a driving current that is provided to the inorganic light emitting device based on the PWM data voltage that is applied to the gate terminal of the second driving transistor.

8. The display apparatus of claim 7, wherein the sub pixel circuit is configured such that, based on a sweep voltage that changes linearly being applied while the constant current generator data voltage is applied to the gate terminal of the first driving transistor and the PWM data voltage is applied to the gate terminal of the second driving transistor, the driving current is provided to the inorganic light emitting device at a magnitude corresponding to the constant current generator data voltage until a voltage of the gate terminal of the second driving transistor is changed according to the sweep voltage and the second driving transistor is turned on.

9. The display apparatus of claim 7, wherein:

the constant current generator circuit comprises a fourth transistor configured to apply the constant current generator data voltage to the gate terminal of the first driving transistor while in a turned-on state, the PWM circuit comprises:

a second capacitor which comprises a first end to which a linearly changing sweep voltage is applied and a second end which is coupled with the gate terminal of the second driving transistor, and a fifth transistor configured to apply the PWM data voltage to the gate terminal of the second driving transistor while in a turned-on state, and a drain terminal of the second driving transistor is coupled to the gate terminal of the first driving transistor.

10. The display apparatus of claim 2, wherein:

the image data voltage is applied to the sub pixel circuit during a data setting interval from among one image frame period, the inorganic light emitting device is configured to emit light based on the applied image data voltage in a light emitting interval from among the one image frame period, and the sub pixel circuit comprises a fifth transistor by which a source terminal is coupled to a drain terminal of the first driving transistor, the drain terminal being coupled to a ground voltage terminal, the fifth transistor being turned on during the light emitting interval.

11. The display apparatus of claim 1, wherein:

the sub pixel circuit comprises:

a first transistor by which a source terminal is coupled to a first drain terminal of the first driving transistor, the first drain terminal being coupled to the sensing part, and a third transistor by which a source terminal is coupled to a second drain terminal of the second driving transistor, the second drain terminal being coupled to the sensing part, and the first current is provided to the sensing part through the first transistor while the first specific voltage is being applied to the gate terminal of the first driving transistor, and the second current is provided to the sensing part through the third transistor while the second specific voltage is being applied to the gate terminal of the second driving transistor.

12. The display apparatus of claim 1, wherein:

the constant current generator circuit comprises a second transistor which is parallel coupled with the inorganic light emitting device, the constant current generator data voltage is applied to the gate terminal of the first driving transistor while the second transistor is in a turned-on state, and the driving current is configured to flow in the inorganic light emitting device while the second transistor is in a turned-off state.

13. The display apparatus of claim 1, wherein the constant current generator circuit comprises:

a first capacitor which is coupled between a source terminal and the gate terminal of the first driving transistor, and a voltage at both ends of the first capacitor is maintained regardless of a forward voltage drop in the inorganic light emitting device.

14. The display apparatus of claim 1, wherein the sensing part is configured to:

sense current that flows in the driving transistor based on the specific voltage that is applied in a blanking interval of one image frame, and output sensing data corresponding to the sensed current.

* * * * *